United States Patent
Ayuzawa et al.

(10) Patent No.: US 11,149,678 B2
(45) Date of Patent: Oct. 19, 2021

(54) STROKE DETERMINATION DEVICE FOR 4-STROKE ENGINE

(71) Applicant: MAHLE ELECTRIC DRIVES JAPAN CORPORATION, Shizuoka-Ken (JP)

(72) Inventors: Takuma Ayuzawa, Shizuoka (JP); Masayuki Sugiyama, Shizuoka (JP); Yushi Suzuki, Shizuoka (JP); Naoya Takamura, Shizuoka (JP)

(73) Assignee: MAHLE ELECTRIC DRIVES JAPAN CORPORTION, Shizuoka-Ken (JP)

( * ) Notice: Subject to any disclaimer, the term of this patent is extended or adjusted under 35 U.S.C. 154(b) by 238 days.

(21) Appl. No.: 16/493,839

(22) PCT Filed: Mar. 20, 2018

(86) PCT No.: PCT/JP2018/011180
§ 371 (c)(1),
(2) Date: Sep. 13, 2019

(87) PCT Pub. No.: WO2018/180814
PCT Pub. Date: Oct. 4, 2018

(65) Prior Publication Data
US 2020/0011265 A1    Jan. 9, 2020

(30) Foreign Application Priority Data

Mar. 30, 2017  (WO) .................. PCT/JP2017/013302

(51) Int. Cl.
*F02D 45/00*   (2006.01)
*F02P 1/08*    (2006.01)
(Continued)

(52) U.S. Cl.
CPC .............. *F02D 45/00* (2013.01); *F02P 1/086* (2013.01); *F02P 3/04* (2013.01); *F02P 3/0407* (2013.01);
(Continued)

(58) Field of Classification Search
CPC ........ H01F 38/12; H01F 2038/122–127; F02P 1/08; F02P 3/02–0558; F02P 3/08–096;
(Continued)

(56) References Cited

U.S. PATENT DOCUMENTS 5,067,462 A   11/1991   Iwata et al.
5,778,854 A   7/1998    Arai
(Continued)

FOREIGN PATENT DOCUMENTS

JP   H03-134247   6/1991
JP   H09-280150   10/1997
(Continued)

OTHER PUBLICATIONS

International Search Report for PCT/JP2018/011180, dated May 22, 2018.

*Primary Examiner* — Hung Q Nguyen
*Assistant Examiner* — Mark L. Greene
(74) *Attorney, Agent, or Firm* — Pearne & Gordon LLP

(57) ABSTRACT

Provided is a stroke determination device which detects a secondary output from an ignition coil without using a high breakdown voltage element, and is capable of accurately establishing the stroke being carried out during an ignition operation of a four-stroke engine from the waveform of the detected secondary output. In the present invention, a secondary coil of an ignition coil is constituted from a first coil portion, and a second coil portion wound so as to have fewer windings than does the first coil portion and connected in series to the first coil portion. A tap is drawn out from a
(Continued)

boundary part between both coil portions, the voltage at both ends of the second coil portion or the current flowing through the second coil portion is detected through the tap, and a parameter to be used in stroke determination is detected from the waveform of the detected voltage or current.

11 Claims, 15 Drawing Sheets

(51) Int. Cl.
*F02P 3/04* (2006.01)
*F02D 41/00* (2006.01)
*F02P 17/12* (2006.01)
*H02J 7/14* (2006.01)
*H02J 7/34* (2006.01)

(52) U.S. Cl.
CPC .... *F02P 3/0442* (2013.01); *F02D 2041/0092* (2013.01); *F02P 17/12* (2013.01); *H02J 7/14* (2013.01); *H02J 7/345* (2013.01)

(58) Field of Classification Search
CPC .. F02P 15/00; F02P 15/08; F02P 17/12; F02D 45/00; F02D 2041/0092
See application file for complete search history.

(56) References Cited

U.S. PATENT DOCUMENTS

| | | | |
|---|---|---|---|
| 6,971,372 | B2 | 12/2005 | Ott et al. |
| 2005/0126544 | A1 | 6/2005 | Ott et al. |

FOREIGN PATENT DOCUMENTS

| | | |
|---|---|---|
| JP | 2002-054493 A | 2/2002 |
| JP | 2004-257278 A | 9/2004 |
| JP | 2005-515346 | 5/2005 |

STROKE DETERMINATION DEVICE FOR 4-STROKE ENGINE

TECHNICAL FIELD

The present invention relates to a stroke determination device for a four-stroke engine for establishing whether a stroke carried out in each cylinder is an exhaust stroke or a compression stroke when an ignition operation has been carried out in the cylinders of a four-stroke engine.

BACKGROUND ART

In order to cause an engine (internal combustion engine) to operate, ignition must occur in the engine when a crank angle position (rotation angle position of a crankshaft) matches a predetermined ignition position (rotation angle position of the crankshaft when ignition is carried out) set to a final stage of the compression stroke. The ignition position is generally set to a position advanced by a fixed angle from the crank angle position corresponding to top dead center of a piston.

When fuel is supplied to the engine using a fuel injection device, the fuel is preferably injected in a vicinity of an intake stroke of the engine in order to efficiently feed the injected fuel into the cylinder. Therefore, when the ignition position of the engine is controlled, or the fuel injection device is controlled, it is necessary to be able to determine at which stroke the crank angle position of the engine is.

In a two-stroke engine, a single combustion cycle is performed during a single rotation of the crankshaft, and the stroke can therefore be determined by detecting the crank angle position. However, in a four-stroke engine, a single combustion cycle is performed during two rotations of the crankshaft, and therefore, the stroke cannot be determined merely by detecting the crank angle position.

Therefore, in a four-stroke engine, a camshaft sensor that generates a pulse waveform reference signal only once per combustion cycle is mounted on a camshaft that rotates once per combustion cycle, a crankshaft sensor that generates a position detection pulse each time the crankshaft rotates a fixed angle is mounted on the crankshaft, and the position detection pulses generated by the crankshaft sensor are identified with reference to a reference signal generated by the camshaft sensor, whereby the stroke that the engine is at can be determined at the crank angle position detected by using the position detection pulses.

However, there is a problem in that the structure of the engine increases in complexity and the cost of the engine control device is increased when sensors that generate pulse signals are mounted on both the crankshaft and the camshaft.

In a four-stroke engine, it is conceivable to configure the engine control device so that the ignition operation is performed at the same crank angle position in the exhaust stroke and in the compression stroke without the stroke being determined. When fuel can be completely combusted in an expansion stroke by ignition at the regular ignition position set near the crank angle position corresponding to top dead center of the compression stroke, the engine can operate without interference even when engine ignition is carried out at the same crank angle position near top dead center position of the exhaust stroke. However, when the combustion in the expansion stroke is insufficient and the ignition operation is performed near the crank angle position corresponding to top dead center of the exhaust stroke, the fuel remaining in the cylinder combusts and afterfire occurs, which may damage the engine. Additionally, when the ignition operation is performed in both the expansion stroke and the compression stroke, there is a problem in that the frequency of sparking in the spark plug is increased, and the service life of the spark plug is therefore reduced.

In view of the above, it has been proposed, as shown in Patent Document 1, that the engine stroke be determined by providing a DC power supply that applies a DC voltage to a spark plug, connecting to the spark plug an ion current detection circuit for detecting an ion current flowing from the DC power supply through the spark plug, and using the fact that the ion current flowing when the spark plug has caused a discharge is different when the engine stroke is the exhaust stroke and when the engine stroke is the compression stroke.

It has also been proposed, as shown in Patent Document 2, that the stroke performed in the cylinders be determined to be the exhaust stroke or the compression stroke when the ignition operation is performed in the engine cylinders, using the fact that a secondary voltage waveform of an ignition coil differs when the engine stroke is the exhaust stroke and when the engine stroke is the compression stroke.

Further, it has been proposed, as disclosed in Patent Document 3, that the stroke be determined by connecting a current detection resistor in series to a secondary coil of an ignition coil, and using the fact that a waveform of a secondary current of the ignition coil detected from the voltage at both ends of the resistor is different when the stroke at the time of ignition is the exhaust stroke and when the stroke is the compression stroke.

It has also been proposed, as shown in Patent Documents 4 and 5, that the stroke be determined by detecting a primary voltage of an ignition coil that applies a high voltage to a spark plug of each cylinder of an engine, and using the fact that a primary voltage waveform at the time of ignition operation differs when the engine stroke is the exhaust stroke and when the engine stroke is the compression stroke.

PRIOR ART DOCUMENTS

Patent Documents

[Patent Document 1] Japanese Laid-open Patent Application No. 3-134247

[Patent Document 2] Japanese Laid-open Patent Application No. 2004-257278

[Patent Document 3] Japanese Domestic Republication No. 2005-515346

[Patent Document 4] Japanese Laid-open Patent Application No. 9-280150

[Patent Document 5] Japanese Laid-open Patent Application No. 2002-54493

DISCLOSURE OF THE INVENTION

Problems to be Solved by the Invention

When an ion current detection circuit is connected to a spark plug, as shown in Patent Document 1, a voltage detection circuit is connected to both ends of a secondary coil of an ignition coil, as shown in Patent Document 2, or a current detection resistor is connected in series to the secondary coil of the ignition coil, as shown in Patent Document 3, a part of the ignition energy is consumed by the detection circuit and the current detection resistor, and ignition performance is reduced, which is undesirable. Additionally, when the voltage at both ends of the secondary coil of the ignition coil is detected and the stroke is determined based on a waveform of the detected voltage, a circuit for detecting the voltage must be configured using an element with high withstand voltage, and the cost of the detection circuit is therefore unavoidably increased.

As disclosed in Patent Documents 4 and 5, if the stroke is determined using the primary voltage waveform of the ignition coil, the voltage used to determine the stroke can be detected without using an element with high withstand voltage as required when using a secondary voltage waveform. However, in the waveform of the primary voltage of the ignition coil, a spike-form waveform appears before a waveform that reflects a breakdown voltage of the spark plug appears, and it is difficult to distinguish this spike-form voltage and the waveform in which the breakdown voltage appearing thereafter is reflected. Therefore, it is difficult to accurately determine the stroke when the method of detecting the primary voltage of the ignition coil is used.

It is also conceivable to detect the stroke from the waveform of the secondary voltage or secondary current of the ignition coil detected through the detection coil with the detection coil magnetically coupled to the secondary coil of the ignition coil. However, this is not preferred because the structure of the ignition coil becomes complicated and cost is increased.

An object of the present invention is to provide a stroke determination device for a four-stroke engine that detects the waveform of the secondary voltage or secondary current of the ignition coil, and accurately establishes whether the stroke carried out in each cylinder is an exhaust stroke or a compression stroke when an ignition operation has been carried out in the cylinders of a four-stroke engine, without making the structure of the ignition coil more complicated, increasing the cost, or causing the degradation of the ignition performance.

Means to Solve the Problems

The present invention is a stroke determination device for establishing whether a stroke carried out in cylinders is an exhaust stroke or a compression stroke when an ignition operation is carried out in the cylinders of a four-stroke engine comprising an engine body having at least one cylinder, and an ignition device that has an ignition coil provided for each cylinder and induces a high voltage in a secondary coil of the ignition coil by controlling a primary current of the ignition coil, the ignition operation being performed in each cylinder by application of a high voltage induced in the secondary coil of the ignition coil of the ignition device to a spark plug provided to each cylinder.

In a four-stroke engine, when the crank angle position at which an ignition operation is carried out in each cylinder is set to a position slightly advanced from the crank angle position where the piston in each cylinder reaches top dead center, and the ignition operation is carried out in each cylinder when the stroke of each cylinder is the exhaust stroke and when the stroke of each cylinder is in the compression stroke, the pressure in the cylinder is different between the exhaust stroke and the compression stroke. Therefore, a breakdown voltage between discharge gap of the spark plug and a discharge current that flows through the spark plug show different waveforms when the cylinders are in the exhaust stroke and when the cylinders are in the compression stroke.

Therefore, when the ignition operation of each cylinder is performed in both the exhaust stroke and the compression stroke, information related to the waveform of the secondary voltage or secondary current of the ignition coil is acquired each time the ignition operation is performed in each cylinder, the waveform information of the secondary voltage acquired in the present cycle is compared with the waveform information of the secondary voltage acquired in the previous cycle, or the waveform information of the secondary current acquired in the present cycle is compared with the waveform information of the secondary current acquired in the previous cycle, thereby making it possible to determine whether the stroke performed in each cylinder when the ignition operation is carried out in each cylinder is an exhaust stroke or a compression stroke.

The comparison of the waveform of the secondary voltage and the waveform of the secondary current of the ignition coil can be carried out by detecting a parameter showing the characteristics of each waveform and comparing the detected parameter.

The present invention is provided with: parameter detection means for stroke determination, in which a parameter that shows the characteristics of a waveform of voltage appearing at both ends of the secondary coil of the ignition coil or a waveform of the current flowing through the secondary coil of the ignition coil at the time of engine ignition, and shows a different value when the stroke carried out in the cylinders of the engine is the exhaust stroke and when the stroke is the compression stroke when the ignition operation is carried out in the cylinders, is detected as a stroke determination parameter; and stroke determination means for establishing whether the stroke carried out when the ignition operation was carried out in each cylinder of the engine is the exhaust stroke or the compression stroke on the basis of the fact that the stroke determination parameter shows a different value between when the stroke carried out in each cylinder when the ignition operation is carried out in each cylinder is the exhaust stroke and when the stroke is the compression stroke. In the present invention, the secondary coil of the ignition coil comprises a first coil portion, and a second coil portion that has fewer windings than does the first coil portion and is connected in series to the first coil portion, and a tap is drawn out from a boundary part between the first coil portion and the second coil portion. The parameter detection means for stroke determination is configured so as to detect a stroke determination parameter from the waveform of the voltage at both ends of the second coil portion of the secondary coil of the ignition coil by way of the tap.

As described above, when the secondary coil of the ignition coil is configured from the first coil portion and the second coil portion connected to each other in series, the number of windings of the second coil portion is adjusted or the method for winding the second coil portion is formulated to thereby make it possible to use the waveform of the voltage at both ends of the second coil portion detected through the tap as a waveform that approximates the waveform of voltage at both ends of the secondary coil of the ignition coil, or as a waveform that approximates the waveform of current flowing through the secondary coil.

For example, when the second coil portion of the secondary coil of the ignition coil is endowed with sufficient inductance, and the number of windings of the second coil portion is set so that the voltage, which is induced in the second coil portion by change in magnetic flux generated in the iron core around which the ignition coil is wound, is sufficiently higher than the voltage drop generated in the second coil portion by in the resistance part of the coil portion, the waveform of the voltage at both ends of the second coil portion can be used as a waveform that approximates the waveform of the voltage at both ends of the secondary coil of the ignition coil. Also, setting the number of windings of the second coil portion to be sufficiently fewer, and ensuring that the voltage drop generated in the resistance part of the second coil portion is dominant over the voltage induced in the second coil portion by change in magnetic flux generated in the iron core around which the ignition coil is wound makes it possible to use the waveform of the voltage at both ends of the second coil portion as a waveform that approximates the current (discharge current flowing through the spark plug) flowing through the secondary coil of the ignition coil.

As described above, when a secondary coil of an ignition coil comprises a first coil portion and a second coil portion that has fewer windings than does the first coil portion and is connected in series to the first coil portion, and a stroke determination parameter is detected from the waveform of the voltage at both ends of the second coil portion detected through the tap drawn out from the boundary part between both coil portions, the detection circuit for detecting the stroke determination parameter can be configured using a low-cost element with a low withstand voltage. Also, it is not required to provide a detection coil magnetically coupled to the secondary coil of the ignition coil or to provide an ion current detection circuit. Therefore, the detection circuit can be configured using a low-cost element having a low withstand voltage, and in accompaniment therewith, a stroke determination device, which determines whether the stroke performed in each cylinder is the exhaust stroke or the compression stroke when the ignition operation is carried out in each cylinder, can be configured while minimizing increased cost.

Also, when configured as described above, it is not required to connect a voltage detection circuit to both ends of the secondary coil of the ignition coil, connect an ion current detection circuit, or connect a current detection resistor in series to the secondary coil of the ignition coil, and the stroke determination device can therefore be configured without causing degradation in ignition performance.

Furthermore, the waveform of the voltage and the waveform of the current detected on the secondary side of the ignition coil do not include a spike-form waveform at the time of ignition operation. Therefore, it is simple to extract the parameter used for stroke determination from the waveform of the voltage or current detected on the secondary side of the ignition coil. Consequently, according to the present invention, the stroke carried out at the time of ignition operation can be accurately determined.

In one aspect of the present invention, the number of windings of the second coil portion of the secondary coil of the ignition coil is adjusted or the method for winding is formulated to provide a second coil portion such that the waveform of the voltage at both ends of the second coil portion is used as a waveform that approximates the waveform of voltage at both ends of the secondary coil of the ignition coil.

In another aspect of the present invention, a second coil portion of the secondary coil of the ignition coil is provided so that the waveform of the voltage at both ends of the second coil portion of the secondary coil of the ignition coil is used as a waveform that approximates the waveform of current flowing through the secondary coil of the ignition coil.

When the second coil portion of the secondary coil of the ignition coil is provided so that the waveform of the voltage at both ends of the second coil portion of the secondary coil of the ignition coil is used as a waveform that approximates the waveform of the current flowing through the secondary coil of the ignition coil, the primary coil of the ignition coil and the first coil portion of the secondary coil are preferably wound around a shared iron core for ignition coil winding, and the second coil portion of the secondary coil is preferably wound around a different location from said iron core so that the magnetic coupling between the primary coil of the ignition coil and the first coil portion of the secondary coil is strengthened, and the magnetic coupling between the second coil portion of the secondary coil and the first coil portion of the primary coil and secondary coil is weakened.

When such a configuration is adopted, it is possible ensure that the magnetic flux linked to the first coil portion of the secondary coil is mostly unlinked to the second coil portion, the waveform of the voltage at both ends of the second coil portion can therefore be brought closer to the waveform of the secondary current of the ignition coil, and information related to the waveform of the secondary current of the ignition coil can be detected more accurately from the waveform of the voltage at both ends the second coil portion.

Also, when the number of windings of the second coil portion of the secondary coil is set so that the current flowing through the secondary coil of the ignition coil can be detected through the tap, the second coil portion of the secondary coil can be constituted by a pair of coils that have an equal number of windings, are wound in opposite directions, and are connected to each other in parallel.

When such a configuration is adopted, a high voltage for ignition is induced due to control of a primary current in the first coil portion of the secondary coil of the ignition coil when the primary current of the ignition coil is controlled at the time of ignition operation, but since the voltage due to control of the primary current is not induced in the second coil portion, and the waveform of the voltage generated at both ends of the second coil portion is a waveform that approximates the waveform of the secondary current of the ignition coil, information related to the secondary current of the ignition coil can be detected more accurately from the voltage at both ends the second coil portion detected through the tap.

In one aspect of the present invention, the ignition device is a current-interrupting ignition device which performs an ignition operation by interrupting, at an ignition timing of the engine, a current passed through a primary coil of the ignition coil. In this case, the second coil portion is provided so that the waveform of the voltage at both ends of the second coil portion of the secondary coil of the ignition coil is used as a waveform that approximates the waveform of the voltage at both ends of the secondary coil of the ignition coil, and the parameter detection means for stroke determination is configured so as to detect, as the stroke determination parameter, a first peak value appearing in the waveform of the voltage at both ends of the second coil portion detected through the tap each time an ignition operation is carried out in the cylinders of the engine. In this case, the stroke determination means can be configured so as to perform a parameter-establishing process for establishing whether, each time an ignition operation is performed in the cylinders of the engine, the value of the stroke determination parameter detected in the present cycle by the parameter detection means for stroke determination exceeds the value of the stroke determination parameter detected in the previous cycle, and when the value of the stroke determination parameter detected in the present cycle is established by the parameter-establishing process to be in excess of the value of the stroke determination parameter detected in the previous cycle, the stroke carried out when the ignition operation is carried out in the cylinders in the present cycle is established to be the compression stroke.

When a current-interrupting ignition device is used as the ignition device of the engine, the second coil portion is provided so that the waveform of the voltage at both ends of the second coil portion of the secondary coil of the ignition coil is used as a waveform that approximates the waveform of the voltage at both ends of the secondary coil of the ignition coil, and the parameter detection means for stroke determination can be configured so as to detect, as the stroke determination parameter, the time that starts when the voltage at both ends of the second coil portion detected through the tap each time the ignition is carried out in the engine shows a first peak value and ends when the voltage shows a second peak value. In this case, the stroke determination means can be configured so as to perform a parameter-establishing process for establishing whether, each time an ignition operation is performed in the cylinders of the engine, the value of the stroke determination parameter detected in the present cycle by the parameter detection means for stroke determination is less than the value of the stroke determination parameter detected in the previous cycle, and when the value of the stroke determination parameter detected in the present cycle is established by said parameter-establishing process to be less than the value of the stroke determination parameter detected in the previous cycle, the stroke carried out when the ignition operation is carried out in the cylinders in the present cycle is established to be the compression stroke.

When a current-interrupting ignition device is used as the ignition device of the engine, the second coil portion of the secondary coil of the ignition coil is provided so that the waveform of the voltage at both ends of the second coil portion of the secondary coil of the ignition coil is used as a waveform that approximates the waveform of the current flowing through the secondary coil of the ignition coil, and the parameter detection means for stroke determination is configured so as to detect, as the stroke determination parameter, a peak value of the voltage at both ends of the second coil portion detected through the tap each time an ignition operation is carried out in the cylinders of the engine. In this case, the stroke determination means can be configured so as to perform a parameter-establishing process for establishing whether, each time an ignition is performed in the cylinders of the engine, the value of the stroke determination parameter detected in the present cycle by the parameter detection means for stroke determination is less than the value of the stroke determination parameter detected in the previous cycle, and when the value of the stroke determination parameter detected in the present cycle is established by said parameter-establishing process to be less than the value of the stroke determination parameter detected in the previous cycle, the stroke carried out when the ignition operation is carried out in the cylinders in the present cycle is established to be the compression stroke.

In another embodiment of the present invention, the ignition device is a capacitor discharge ignition device comprising an ignition capacitor provided to a primary side of the ignition coil, a capacitor charge circuit for charging the ignition capacitor to one polarity prior to the ignition timing of the engine, and a capacitor discharge circuit for discharging electric charge stored in the ignition capacitor through the primary coil of the ignition coil at the ignition timing of the engine.

In this case, the second coil portion is provided so that the waveform of the voltage at both ends of the second coil portion of the secondary coil of the ignition coil is used as a waveform that approximates the waveform of the voltage at both ends of the secondary coil of the ignition coil, and the parameter detection means for stroke determination is configured so as to detect, as the stroke determination parameter, a first peak value appearing in the waveform of the voltage at both ends of the second coil portion detected through the tap each time ignition is carried out in the engine. In this case, the stroke determination means can be configured so as to perform a parameter-establishing process for establishing whether, each time an ignition operation is performed in the cylinders of the engine, the value of the stroke determination parameter detected in the present cycle by the parameter detection means for stroke determination exceeds the value of the stroke determination parameter detected in the previous cycle, and when the value of the stroke determination parameter detected in the present cycle is established by said parameter-establishing process to be in excess of the value of the stroke determination parameter detected in the previous cycle, the stroke carried out when the ignition operation is carried out in the cylinders in the present cycle is established to be the compression stroke.

When a capacitor discharge ignition device is used as the ignition device, the second coil portion of the secondary coil of the ignition coil is provided so that the waveform of the voltage at both ends of the second coil portion of the secondary coil of the ignition coil is used as a waveform that approximates the waveform of the current flowing through the secondary coil of the ignition coil, and the parameter detection means for stroke determination can be configured so as to detect, as the stroke determination parameter, a first peak value that appears in the waveform of the voltage at both ends of the second coil portion detected through the tap each time an ignition operation is carried out in the cylinders of the engine. In this case, the stroke determination means can be configured so as to perform a parameter-establishing process for establishing whether, each time an ignition operation is performed in the cylinders of the engine, the value of the stroke determination parameter detected in the present cycle by the parameter detection means for stroke determination is less than the value of the stroke determination parameter detected in the previous cycle, and when the value of the stroke determination parameter detected in the present cycle is established by said parameter-establishing process to be less than the value of the stroke determination parameter detected in the previous cycle, the stroke carried out when the ignition operation is carried out in the cylinders in the present cycle is established to be the compression stroke.

As described above, in the present invention, the method for winding the second coil portion of the secondary coil of the ignition coil is formulated, or the number of windings is adjusted to thereby provide a second coil portion such that the waveform of voltage at both ends of the second coil portion approximates the waveform of the secondary voltage of the ignition coil, the wave form of the secondary voltage being the waveform of the voltage at both ends of the spark plug, or such that the waveform of voltage at both ends of the second coil portion approximates the waveform of the secondary current of the ignition coil, the secondary current being the discharge current flowing through the spark plug. The waveform of the secondary voltage or the waveform of the secondary current of the ignition coil is detected from the waveform of the voltage at both ends of the second coil portion, and stroke determination is carried out using, as the stroke determination parameter, a parameter that shows a characteristic portion of the detected waveform. When the present invention is implemented, the manner in which the method for winding the second coil portion of the secondary coil of the ignition coil is formulated or windings adjusted is decided with consideration given to the ease and accuracy of determination when stroke determination is carried out using a stroke determination parameter obtained from the voltage detected through the tap.

In the embodiments described above, in order to more accurately determine the stroke, the stroke determination means is preferably configured so as to finalize the results of stroke determination when establishment that the stroke performed at the time the ignition operation was performed in the cylinders is a compression stroke has been made a fixed number of times.

The result of engine stroke determination by the stroke determination device can, as shall be apparent, be used not only for control of ignition timing of the engine, but also for other control of the engine. For example, when fuel is supplied to the engine from a fuel injection device, the determination result obtained by the stroke determination device according to the present invention can be also used when controlling fuel injection timing.

Advantageous Effects of the Invention

In accordance with the present invention, a secondary coil of an ignition coil is configured from a first coil portion and a second coil portion having fewer windings than does the first coil portion and is connected in series to the first coil portion, and stroke determination parameter is detected from the waveform of the voltage at both ends of the second coil portion of the secondary coil of the ignition coil detected by way of the tap drawn out from the boundary part between the first coil portion and the second coil portion. Therefore, a circuit for detecting the stroke determination parameter can be configured using a low-cost element with a low withstand voltage. Also, in accordance with the present invention, the stroke can be determined without providing an ion current detection circuit that detects the ion current flowing through the spark plug, a detection coil that is magnetically coupled to the secondary coil of the ignition coil, or another extra constituent element, and a stroke determination device can therefore be configured while minimizing increased cost.

In accordance with the present invention, the stroke determination parameter can be detected without connecting a voltage detection circuit in parallel to both ends of the secondary coil of the ignition coil or connecting an ion current detection circuit to the secondary coil, and the stroke determination device can therefore be configured without causing a reduction in the performance of the ignition device.

Also, in accordance with the present invention, the stroke determination parameter is detected from the waveforms of voltage or current, which do not include spike-form waveforms, detected on the secondary side of the ignition coil, and the detection of the stroke determination parameter is therefore facilitated and the stroke can be accurately determined.

BEST MODE FOR CARRYING OUT THE INVENTION

The present invention pertains to a stroke determination device for establishing whether a stroke carried out in the cylinders is an exhaust stroke or a compression stroke when an ignition operation is carried out in the cylinders of a four-stroke engine comprising an engine body having at least one cylinder, and an ignition device having an ignition coil provided for each cylinder and that induces a high voltage in a secondary coil of an ignition coil by controlling a primary current of the ignition coil, ignition being performed by application of a high voltage induced in the secondary coil of the ignition coil of the ignition device to a spark plug. The stroke determination device according to the present invention extracts a stroke determination parameter from the waveform of voltage or the waveform of current detected from the secondary side of the ignition coil of the ignition device, and determines the stroke using the extracted parameter. Consequently, the stroke determination device according to the present invention is incorporated and used in an ignition device for ignition in an engine.

Figure 1:
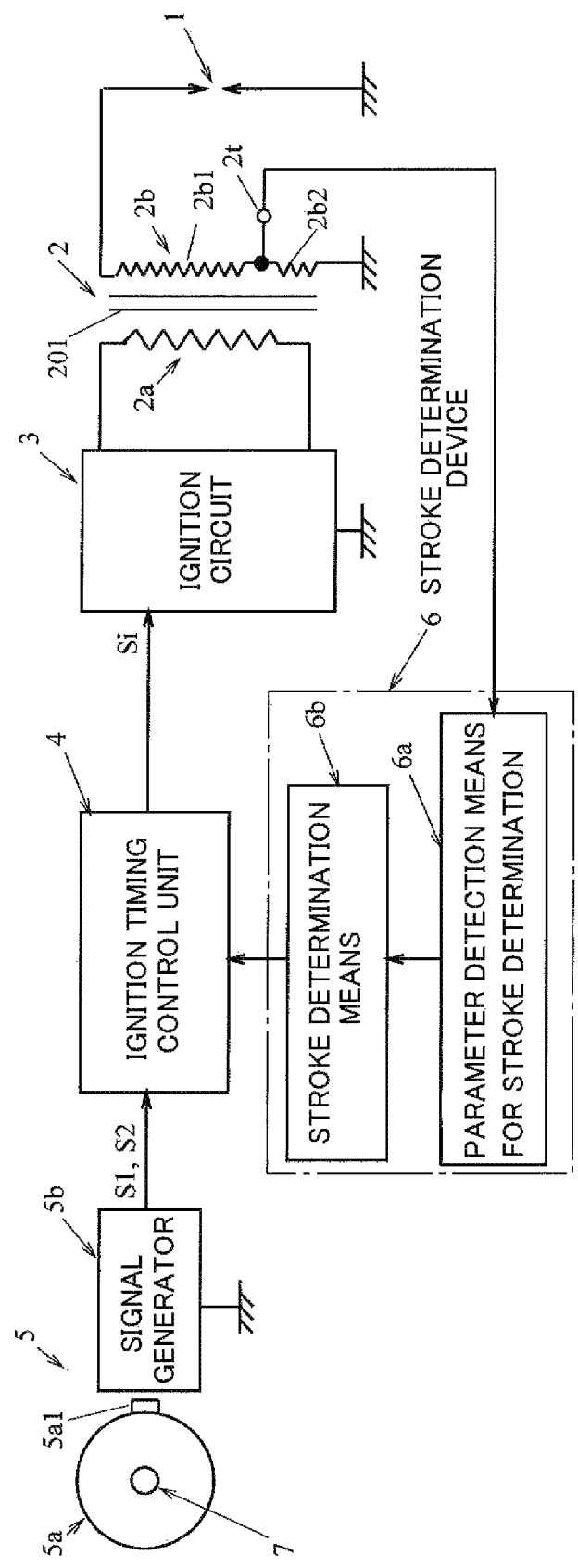
FIG. 1 is a block diagram schematically showing a configuration example of an ignition device for a four-stroke engine in which the stroke determination device of the present invention has been incorporated.

FIG. 1 schematically shows a configuration example of an ignition device for a four-stroke engine in which the stoke determination device of the present invention has been incorporated. For convenience of description, in the present embodiment, the engine is a single cylinder engine. In FIG. 1, the reference symbol 1 is a spark plug provided to a cylinder of an engine body (not shown), 2 is an ignition coil that has a primary coil 2a and a secondary coil 2b wound around an iron core 201, and that induces, in the secondary coil 2b, a high voltage to be applied to the spark plug 1 when ignition is carried out in the engine, 3 is an ignition circuit for controlling the primary current of the ignition coil 2 so that a high voltage is induced in the secondary coil 2b of the ignition coil when an ignition command Si is given, 4 is an ignition timing control unit for controlling the crank angle position for imparting the ignition command Si to the ignition circuit 3 in order to control the ignition timing of the engine, 5 is a signal generator for generating a pulse signal each time the crankshaft of the engine rotates a fixed angle in order to provide rotation angle information and rotation speed information of the engine to the ignition timing control unit 4, and 6 is the stroke determination device according to the present invention.

The ignition circuit 3 may be a circuit that controls the primary current of the ignition coil so that high voltage for ignition is induced in the secondary coil 2b of the ignition coil when the ignition command Si is given. A current interrupting circuit and a capacitor discharge circuit are widely known as the ignition circuit 3, but the ignition circuit used in the present invention may be any of these types of circuits.

The ignition timing control unit 4 comprises, e.g., ignition position computation means for computing an ignition position of the engine with respect to rotational speed of the engine, the ignition position being the crank angle position at which an ignition operation is carried out, engine temperature, and various other control conditions, and ignition position detection means for detecting the ignition position computed using crank angle information obtained from a signal generated by the signal generator 5. When the ignition position detecting means has detected the computed ignition position, the ignition command Si is given to the ignition circuit 3 to cause the ignition operation to be carried out.

The ignition position of the engine cylinders is ordinarily computed in the form of an angle θx from a reference position set to a position advanced in angle sufficiently beyond the crank angle position that corresponds to top dead center of the piston in the cylinders to the ignition position. The ignition position detection means computes the time required for the crankshaft to rotate through the section of the angle θx from the reference position to the ignition position with the engine rotational speed at each instant obtained from the signal generated by the signal generator 5, sets the computed time in the ignition timer to start the measurement, and generates the ignition command Si when the measurement of the time when the ignition timer is set is completed.

The signal generator 5 shown in the drawing comprises an iron rotor 5a mounted on the crankshaft 7 of the engine, and a signal generator 5b that detects a protrusion or reluctor 5a1 provided on the outer periphery of the rotor 5a and generates a pulse signal. The signal generator 5b comprises, e.g., an iron core for signal generation having a magnetic pole part that faces the reluctor 5a1, a signal coil wound around the iron core, and a permanent magnet which causes a magnetic flux to flow to the iron core for signal generation, and, in the process of the reluctor 5a1 rotating together with the crankshaft. The signal coil induces pulses having different polarity due to the change in the magnetic flux generated when the reluctor 5a1 starts to face the magnetic pole part of the iron core and when the reluctor ends the facing.

The signal generator 5 is not limited to the above-described configuration, and may have any configuration as long as a signal is generated that allows rotation angle position information and rotational speed information required for controlling the engine to be obtained.

The signal generator 5 used in the present embodiment generates a first pulse S1 and a second pulse S2 when, in the process of the crankshaft rotating a single rotation, the rotation angle position (crank angle position) of the crankshaft matches a first crank angle position and a second crank angle position, respectively. In the present embodiment, the first crank angle position is set to a position sufficiently advanced in angle from the crank angle position (hereinafter referred to as top dead center position) corresponding to top dead center of the engine piston, and the second crank angle position is set at a position delayed from the first crank angle position and slightly advanced in angle from top dead center position. In the present embodiment, using the first crank angle position generated by the first pulse S1 as a reference position, measurement of the ignition position of the engine is started at this reference position. The ignition timing control unit 4 obtains the rotational speed information of the engine from the generation interval of the first pulse S1 generated by the signal generator 5.

The stroke determination device 6 comprises a stroke determination parameter detection means 6a for detecting a stroke determination parameter used for determining whether the stroke performed the cylinders when the ignition operation is performed in the cylinders of the engine is the exhaust stroke or the compression stroke, and a stroke determination means 6b for determining a stroke using the parameter detected by the stroke determination parameter detection means 6a.

As the stroke determination parameter, it is possible to use a parameter that shows a value that is different between when the stroke performed in the cylinders when the ignition operation is performed in the cylinders of the engine is an exhaust stroke and when the stroke is a compression stroke, the parameter showing the characteristics of the waveform of the secondary voltage appearing at both ends of the secondary coil of the ignition coil at the time of ignition in the engine, or the waveform of the secondary current or the discharge current flowing through the secondary coil of the ignition coil and the spark plug.

A peak value of the voltage, the time interval between peak values, or another factor are examples that may be used as the parameter indicating the characteristic of the waveform of the voltage that appears at both ends of the secondary coil of the ignition coil at the time of engine ignition. The voltage appearing at both ends of the secondary coil of the ignition coil during engine ignition is a very high voltage (ordinarily 20,000 to 30,000 volts), and it is therefore not easy to directly detect the voltage at both ends of the secondary coil and to detect the peak value or the like from the detected voltage. Also, it is not preferred to connect a voltage detection circuit to both ends of the secondary coil of the ignition coil in that a part of ignition energy is consumed by the voltage detection circuit and ignition performance is reduced.

The current flowing through the secondary coil of the ignition coil can be detected by connecting a current detection resistor in series to the secondary coil of the ignition coil, but it is not preferred to connect a resistor in series to the secondary coil of the ignition coil in that a part of ignition energy is consumed by the resistor and ignition performance is reduced.

It is also possible to consider magnetically coupling a detection coil to the secondary coil of the ignition coil and using this detection coil to detect the current flowing through the secondary coil of the ignition coil, but it is not preferred to provide such a detection coil in that the structure of the ignition coil becomes complicated and cost is increased as noted above.

In order to prevent the occurrence of problems such as those described above, in the present embodiment, the secondary coil 2b of the ignition coil 2 comprises a first coil portion 2b1 and a second coil portion 2b2 that has fewer windings than does the first coil portion 2b1 and is connected in series to the first coil portion 2b1. A tap 2t is drawn out from a boundary part between the first coil portion 2b1 and the second coil portion 2b2, and a stroke determination parameter is detected from the voltage at both ends of the second coil portion 2b2 of the secondary coil 2b through the tap 2t. Examples of a stroke determination parameter that can be used include a first peak value appearing in the waveform of the voltage at both ends of the second coil portion detected through the tap 2t each time ignition is carried out in the engine, and the time that starts when the voltage at both ends of the coil portion shows the first peak value and ends when the voltage shows a second peak value.

The first coil portion 2b1 and the second coil portion 2b2 may be wound using different conductors, but the first coil portion 2b1 and the second coil portion 2b1 are preferably wound continuously using the same conductor in order to facilitate winding of the coil and to prevent an increase in cost.

When the secondary coil of the ignition coil is configured from the first coil portion 2b1 and the second coil portion 2b2 connected to each other in series, and a tap is drawn out from the boundary part between the first coil portion 2b1 and the second coil portion 2b2, the number of windings of the second coil portion 2b2 is adjusted or the method for winding the second coil portion 2b2 is formulated to thereby make it possible to use the waveform of the voltage at both ends of the second coil portion 2b2 as a waveform that approximates the voltage at both ends of the secondary coil 2b of the ignition coil, or as a waveform that approximates the waveform of current flowing through the secondary coil 2b and the spark plug 1. Also, the duration of discharge generated in the spark plug 1 can also be detected from the voltage waveform at both ends of the second coil portion 2b2.

For example, endowing the second coil portion 2b2 of the secondary coil 2b of the ignition coil with sufficient inductance, and setting the number of windings of the second coil portion 2b2 so that the voltage, which is induced in the second coil portion 2b2 by change in magnetic flux generated in the iron core around which the ignition coil is wound, is sufficiently higher than the voltage drop generated in the resistance part of the second coil portion by the secondary current of the ignition coil makes it possible to use the waveform of the voltage at both ends of the second coil portion 2b2 as a waveform that approximates the waveform of the voltage at both ends of the secondary coil 2b, and the peak value of the voltage at both ends of the second coil portion can be used as the voltage value proportional to the peak value that appears in the waveform of the voltage at both ends of the spark plug, Said voltage drop generated in the resistance part of the second coil portion is a voltage resulting from the product of the secondary current and the resistance of the second oil portion.

Also, setting the number of windings of the second coil portion 2b2 to be sufficiently fewer, and ensuring that the voltage drop generated in the resistance part of the second coil portion 2b2 by the secondary current of the ignition coil is dominant over the voltage induced in the second coil portion 2b2 by change in magnetic flux generated in the iron core around which the ignition coil 2 is wound makes it possible to use the waveform of the voltage at both ends of the second coil portion 2b2 as a waveform that approximates the waveform of discharge current flowing through the spark plug 1 and the secondary coil 2b of the ignition coil, and to detect the current value proportional to the peak value of the discharge current from the voltage at both ends of the second coil portion 2b2. Also, the duration of discharge generated in the spark plug 1 can be detected from the voltage waveform at both ends of the second coil portion 2b2.

The waveform of the voltage detected through the tap 2t drawn out from the secondary coil of the ignition coil will be described in the explanation of more specific embodiments of the present invention.

The parameter detection means 6a for stroke determination can have various configurations in accordance with the stroke determination parameter used for stroke determination. For example, when the peak value of the voltage detected through the tap 2t of the secondary coil of the ignition coil is used, the parameter detection means 6a for stroke determination can be configured using a peak detection circuit comprising a hardware circuit. Also, when a parameter showing the waveform of a specific portion of the waveform of the voltage detected through the tap 2t of the secondary coil of the ignition coil is used as the stroke determination parameter, the parameter detection means 6a for stroke determination can be configured by executing, in a microcomputer, a process for identifying a shape of the waveform.

The stroke determination means 6b determines whether the stroke carried out in the cylinders when the ignition operation was carried out in the cylinders is the exhaust stroke or the compression stroke, on the basis of the fact that the stroke determination parameter shows a different value when the stroke carried out in the cylinders when the ignition operation is carried out in the cylinders of the engine is the exhaust stroke and when the stroke is the compression stroke. The stroke determination means 6b is implemented by executing a predetermined process in the microcomputer.

Engine stroke determination by the stroke determination device 6 can be carried out once, and thereafter performed mechanically. Therefore, the determination does not need to be repeatedly carried out during engine operation, and the determination can be carried out immediately after the engine has started.

The result of stroke determination by the stroke determination device 6 can be used not only for control of ignition timing of the engine, but also for other control of the engine. For example, when fuel is supplied to the engine from a fuel injection device, the determination result obtained by the stroke determination device according to the present invention can be also used when controlling fuel injection timing.

Figure 2:
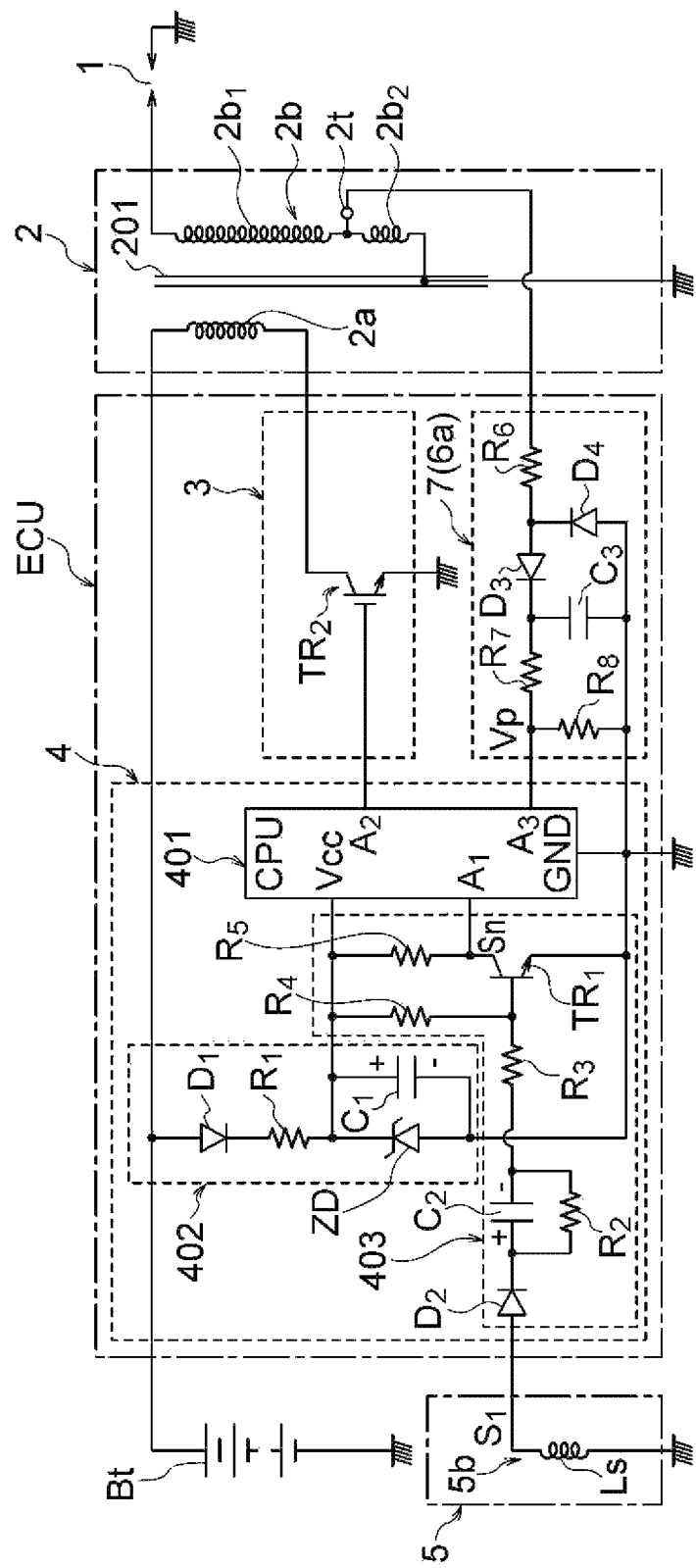
FIG. 2 is a circuit diagram showing, in greater detail, a configuration example of an ignition device for a four-stroke engine in which the stroke determination device of the present invention has been incorporated.

Referring to FIG. 2, a hardware configuration example of a more specific embodiment is shown for the case in which a current-interrupting ignition device is used as an ignition device for ignition in the engine. In the example shown in FIG. 2, the ignition timing control unit 4 comprises a microcomputer 401, a constant voltage power supply circuit 402 that provides a power supply voltage between the ground terminal GND and the power supply terminal Vcc of the microcomputer 401 using a DC power supply comprising a battery Bt as a power supply, and a rotation signal input circuit 403 for inputting to the microcomputer 401 a rotation signal sn each time the rotation angle position of the engine crankshaft matches a reference position and the signal generator 5 generates a pulse signal S1.

The constant voltage power supply circuit 402 comprises a diode D1 whose anode is connected to a positive terminal of the battery Bt whose negative terminal is grounded, a Zener diode ZD whose cathode is connected to the cathode of the diode D1 through a resistor R1 and whose anode is grounded, and a power supply capacitor C1 connected to both ends of the Zener diode ZD, and generates a constant voltage (e.g., a voltage of 5 volts) equal to the Zener voltage of the Zener diode ZD at both ends of the capacitor C1. This voltage is applied between the non-ground-side power supply terminal Vcc and the ground terminal GND of the microcomputer 401.

The rotation signal input circuit 403 comprises a diode D2 in which the anode is connected to the other end of the signal coil Ls provided to the signal emitting electron 5b of the signal generator 5 and whose one end is grounded, a capacitor C2 in which one end is connected to the cathode of the diode D2, a resistor R2 connected in parallel to both ends of the capacitor C2, an NPN transistor TR1 whose base is connected to the other end of the capacitor C2 by way of a resistor R3 and whose emitter is grounded, a resistor R4 connected between the base of the transistor TR1 and the positive electrode-side output terminal of the constant voltage power supply circuit 402, the positive electrode-side output terminal being a non-ground-side terminal of the capacitor C1, and a resistor R5 connected between the collector of the transistor TR1 and the positive electrode-side output terminal of the constant voltage power supply circuit 402. The collector of the transistor TR1 is connected to a port A1 of the microcomputer 401.

In the rotation signal input circuit 403 shown in the drawings, the parallel circuit of the capacitor C2 and the resistor R2 constitutes a bias circuit which applies a reverse bias to the diode D2 in order to prevent the rotation signal from being inputted to the microcomputer due to a noise signal, and when the first pulse S1 induced in the signal coil Ls exceeds the voltage (threshold value) at both ends of the capacitor C2, the transistor TR1 is switched on and the potential of collector thereof is reduced. The microcomputer 401 recognizes, as a rotation signal sn, a decrease in the potential of the transistor TR1 generated when the first pulse S1 has exceeded the threshold value. In this manner, the rotation signal sn is inputted to the microcomputer 401 each time the signal generator 5 generates the first pulse S1 at the reference position.

In the example shown in FIG. 2, one end of the primary coil 2a of the ignition coil 2 is connected to the positive terminal of the battery Bt, and the other end of the primary coil 2a is connected to the collector of an insulated gate transistor TR2 whose emitter is grounded. The gate of transistor TR2 is connected to a port A2 of microcomputer 401, and when a drive signal is applied from the port A2 to the gate of transistor TR2, transistor TR2 is switched on, and when the drive signal applied from the port A2 to the gate of transistor TR2 disappears, the transistor TR2 is switched off. In this example, the transistor TR2 constitutes the current-interrupting ignition circuit 3.

The microcomputer 401 confirms whether an engine stroke determined by the stroke determination means is the compression stroke or the exhaust stroke each time the first pulse S1 is generated and the rotation signal sn is inputted to the port A1, and when it has been confirmed that the stroke thus determined is the compression stroke, a drive signal is applied from the port A2 to the gate of the transistor TR2. As a result, the transistor TR2 is switched on, and current flows from the battery Bt through the primary coil 2a of the ignition coil and the collector and emitter of the transistor TR2.

Also, the microcomputer 401 confirms whether an engine stroke determined by the stroke determination means is the compression stroke or the exhaust stroke each time the rotation signal sn is inputted to the port A1, and when it has been confirmed that the stroke thus determined is the exhaust stroke, supply of a drive signal to the gate of the transistor TR2 is halted to keep the transistor TR2 switched off.

The microcomputer 401 computes the engine rotational speed from an occurrence interval of the rotation signal sn each time the rotation signal sn is inputted by way of the signal input circuit 403 and stores the computed rotational speed in RAM, the occurrence interval of the rotation signal sn being the occurrence interval of the first pulse S1. The microcomputer also computes the engine ignition position in relation to the rotational speed stored in RAM. The ignition position is calculated in the form of an angle θx from the reference position to the ignition position. The microcomputer also computes, as time for ignition timing measurement, the time required to rotate through the section of the angle θx computed from the reference position which is the occurrence position of the first pulse S1 at the rotational speed stored in the RAM when the rotation signal was inputted, and sets the computed time for ignition timing measurement in the ignition timer to start the measurement. The microcomputer causes the drive signal applied from the port A2 to the transistor TR2 to disappear when measurement of the time for ignition timing measurement for which the ignition timer has been set is completed.

When it is determined that the engine stroke is the compression stroke when the rotation signal is inputted to the microcomputer, the microcomputer applies a drive signal to the transistor TR2 when the rotation signal is inputted, and said transistor is therefore switched on, and current flows from the battery Bt through the primary coil 2a of the ignition coil and the transistor TR2. When the measurement of the time for ignition timing measurement for which the ignition timer has been set is completed, the microcomputer stops supplying the drive signal to the transistor TR2, the transistor TR2 is therefore switched from on to off, and the primary current of the ignition coil 2 that had been flowing until then is interrupted. A large change in magnetic flux thereby occurs in the iron core of the ignition coil 2, and a high voltage for ignition is therefore induced in the secondary coil 2b of the ignition coil. This high voltage is applied to the spark plug 1 mounted in the cylinder of the engine, and a spark discharge therefore occurs in the spark plug 1 to bring about engine ignition.

When it is determined that the engine stroke is the exhaust stroke when the rotation signal is inputted to the microcomputer, the transistor TR2 is not switched on, and the ignition operation is therefore not carried out when the measurement of the time for ignition timing measurement for which the ignition timer has been set is completed.

In the present embodiment, rotational speed detection means is configured by a process for computing and storing in RAM the engine rotational speed from the occurrence interval of the first pulse S1 generated by the signal generator 5, the occurrence interval being the occurrence interval of the rotation signal sn, and ignition position computation means is configured by a process for computing the angle θx from the reference position to the ignition position in relation to the rotational speed stored in RAM. Also, ignition timing detection means is configured from a process in which the time required for the crankshaft to rotate through the section of the angle θx is computed as time for ignition timing measurement, and the computed time for ignition timing measurement is set in the ignition timer to start the measurement.

In the present embodiment, among the components of the stroke determination device 6, the parameter detection means 6a for stroke determination is constituted by a voltage detection circuit 7 comprising a hardware circuit, and the stroke determination means 6b causes the microcomputer 401 to execute a program stored in ROM.

In the present embodiment, it is envisioned that the peak value of the waveform of voltage detected through the tap 2t drawn out from the secondary coil of the ignition coil, or the time interval between peak values is used as a parameter, and the parameter detection means 6a for stroke determination is configured from the voltage detection circuit 7 for detecting the peak value of voltage detected through the tap 2t. The voltage detection circuit 7 constituting the parameter detection means 6a for stroke determination is configured from a resistor R6 having one end connected to the tap 2t drawn out from the boundary part between the first coil portion 2b1 and the second coil portion 2b2 of the secondary coil 2b of the ignition coil 2, a diode D3 having an anode connected to the other end of the resistor R6 and a cathode connected to a port A3 of the microcomputer 401 by way of a resistor R7, a capacitor C3 connected between the cathode of diode D3 and ground, a diode D4 whose anode is grounded and whose cathode is connected to the anode of the diode ignition circuit 3, and a resistor R8 connected between the port A3 of microcomputer 401 and ground.

The voltage detection circuit 7 shown in FIG. 2 generates, at both ends of the resistor R8, a DC voltage signal Vp having a voltage value substantially equal to the peak value of the voltage at both ends of the second coil portion 2b2 of the secondary coil 2b of the ignition coil 2. The port A3 of the microcomputer 401 is an A/D input terminal, and the DC voltage signal obtained at both ends of the resistor R8 is converted to a digital signal so as to be inputted to the CPU of the microcomputer. The voltage at both ends of the second coil portion 2b2 detected through the tap 2t presents a waveform approximate to the waveform of the voltage at both ends of the secondary coil 2b of the ignition coil 2, or presents a waveform approximate to the waveform of the current flowing through the secondary coil of the ignition coil in accordance with the number of windings, the winding method, or other factor of the second coil portion 2b2, and the DC voltage signal Vp outputted by the voltage detection circuit 7 shown in the drawings is therefore a signal having a voltage value proportional to the peak value of the voltage at both ends of the secondary coil 2b of the ignition coil, or a voltage value proportional to the peak value of the current flowing through the secondary coil 2b.

For example, endowing the second coil portion 2b2 of the secondary coil 2b of the ignition coil with sufficient inductance, and setting the number of windings of the second coil portion 2b2 so that the voltage, which is induced in the second coil portion 2b2 by change in magnetic flux generated in the iron core 201 around which the ignition coil is wound, is sufficiently higher than the voltage drop generated by the DC resistance of the second coil portion 2b2 due to the current flowing through the secondary coil of the ignition coil, makes it possible to use the waveform of the voltage at both ends of the second coil portion 2b2 as a waveform that approximates or resembles the waveform of the voltage at both ends of the secondary coil, and to use the voltage value of the DC voltage signal Vp as the voltage value proportional to the peak value of voltage at both ends of the secondary coil of the ignition coil (voltage at both ends of the spark plug 1).

Also, setting the number of windings of the second coil portion 2b2 of the secondary coil of the ignition coil to be sufficiently fewer, and ensuring that the voltage drop generated in the second coil portion by the secondary current of the ignition coil is dominant over the voltage induced in the second coil portion by change in magnetic flux generated in the iron core around which the ignition coil is wound makes it possible to use the waveform of the voltage at both ends of the second coil portion as a waveform that approximates or resembles the waveform of the secondary current of the ignition coil, and to use the voltage value of the DC voltage signal Vp obtained from the voltage detection circuit 7 as the voltage value proportional to the peak value of the secondary current of the ignition coil.

Figure 3:
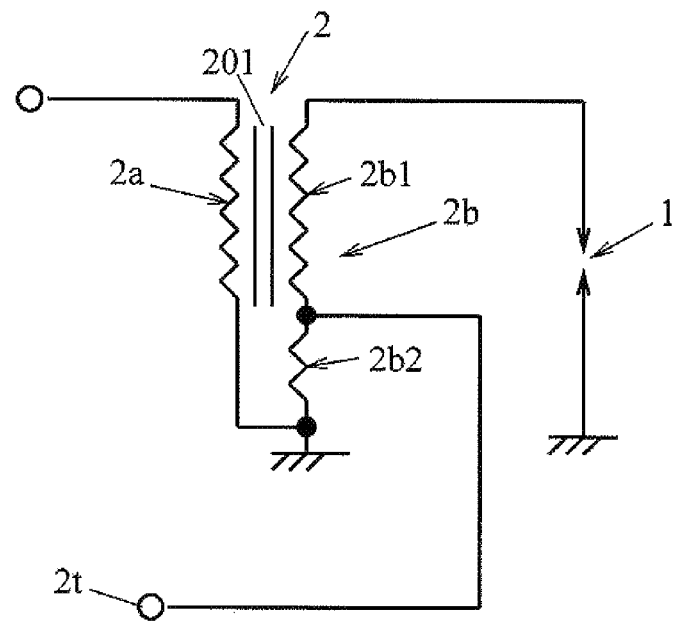
FIG. 3 is a wiring configuration diagram showing a modification the ignition coil of the ignition device in which the stroke determination device of the present invention has been incorporated.

Also, as shown in FIG. 3, the waveform of the voltage at both ends of the second coil portion can be used as the waveform that approximates or resembles the waveform of the secondary current of the ignition coil, and the voltage value of the DC voltage signal Vp obtained from the voltage detection circuit 7 can be used as the voltage value proportional to the peak value of the secondary current of the ignition coil by also winding the primary coil 2a of the ignition coil 2 and the first coil portion 2b1 of the secondary coil around a shared iron core 201 for ignition coil winding, winding the second coil portion 2b2 of the secondary coil 2b around a different location from the iron core 201 for ignition coil winding, and weakening the magnetic coupling between the first coil portion 2b1 and the second coil portion 2b2.

Figure 4:
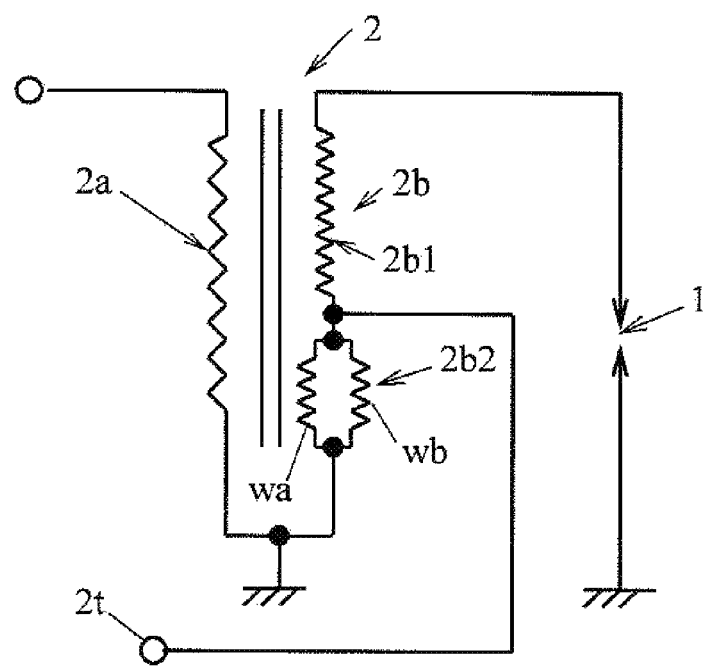
FIG. 4 is wiring configuration diagram showing another modification of the ignition coil of the ignition device in which the stroke determination device of the present invention has been incorporated.

Furthermore, as shown in FIG. 4, when the second coil portion 2b2 of the secondary coil of the ignition coil is configured from a pair of coils wa and wb which are wound with an equal number of windings in opposite directions and are connected in parallel to each other, a high voltage for ignition is induced in the first coil portion 2b1 of the secondary coil 2b of the ignition coil by the control of the primary current when the primary current of the ignition coil is controlled during the ignition operation. In the second coil portion 2b2, the voltage induced in the coil wa and the voltage induced in the coil wb cancel each other out and the voltage caused by the control of the primary current is not induced, and the waveform of the voltage generated at both ends of the second coil portion 2b2 therefore becomes the waveform of approximate to the waveform of the secondary current of the ignition coil. When the second coil portion 2b2 is thusly configured as well, the waveform of the voltage at both ends of the second coil portion detected through the tap 2t can be used as the waveform that approximates the waveform of the secondary current of the ignition coil, and the voltage value of the DC voltage signal Vp obtained from the voltage detection circuit 7 can be used as the voltage value proportional to the peak value of the secondary current of the ignition coil.

In the example shown in FIG. 2, an electronic control unit (ECU) is configured from the electronic components constituting the ignition circuit 3, the electronic components constituting the ignition timing control unit 4, and the electronic components constituting the parameter detection means 6a for stroke determination, which are housed in a shared casing.

Next, various stroke determination parameters that can be detected from the waveform of the voltage detected through the tap 2t of the ignition coil 2 and the method for stroke determination using the detected stroke determination parameters will be described for the case in which a current-interrupting ignition device such as shown in FIG. 2 is used as the ignition device for performing ignition in an engine.

Figure 5:
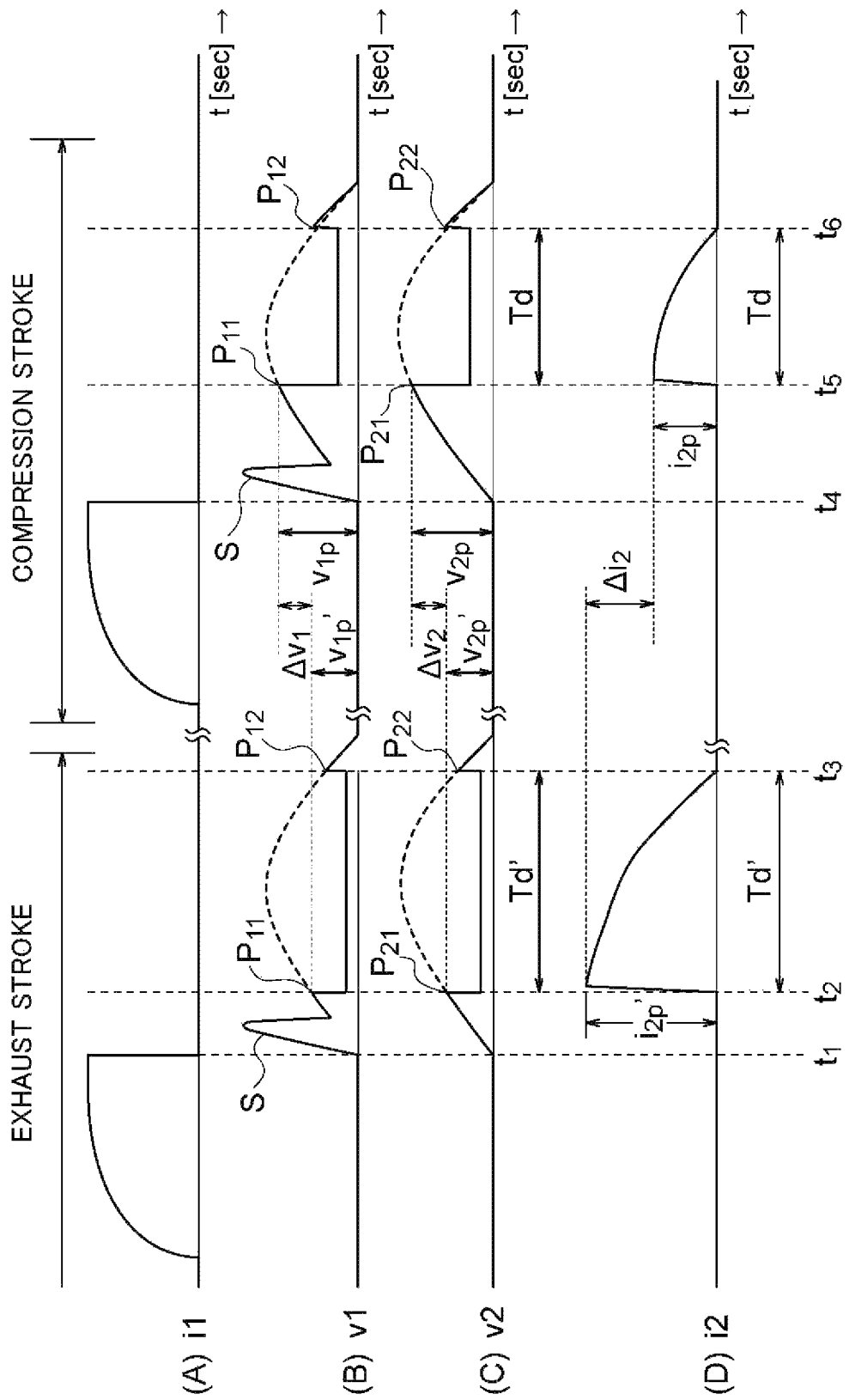
FIG. 5 is a waveform diagram schematically showing an example of waveforms of the voltage and current detected in the primary side and secondary side of the ignition coil of the ignition device of FIG. 4.

FIG. 5 schematically shows waveforms of the current and voltage detected in the primary side of the ignition coil and the waveform of voltage detected through the tap 2t in the secondary side for the case in which a current-interrupting circuit is used as the ignition circuit 3, as shown in FIG. 2. FIG. 5(A) shows the waveform of a primary current i1 of the ignition coil 2, and FIG. 5(B) shows the waveform of a primary voltage v1 of the ignition coil. These waveforms are observed by a measuring instrument not shown in FIG. 2.

FIG. 5(C) shows the waveform of a voltage v2 detected though the tap 2t for the case in which the number of windings of the second coil portion 2b2 is set so that the waveform of the voltage at both ends of the second coil portion 2b2 of the secondary coil of the ignition coil is made to be a waveform that approximates the waveform of voltage at both ends of the secondary coil 2b. The voltage v2 shall be referred to as secondary detection voltage for distinction from the secondary voltage which is the voltage at both ends of the secondary coil 2b of the ignition coil.

FIG. 5(D) shows the waveform of a voltage detected though the tap 2t for the case in which the number of windings of the second coil portion of the secondary coil of the ignition coil is set so that the waveform of the voltage at both ends of the second coil portion 2b2 of the secondary coil 2b of the ignition coil is made to be a waveform that approximates the waveform of secondary current flowing through the secondary coil of the ignition coil. The waveform shown in FIG. 5(D) is actually a waveform of the voltage at both ends of the second coil portion 2b2 detected through the tap 2t, but since this waveform has been approximated to the waveform of the secondary current i2 of the ignition coil, this waveform will be used as the waveform of the secondary current i2 in the description below.

In the example shown in FIG. 5, the primary current i1 of the ignition coil is interrupted at time t1 and time t4 to perform ignition operations. Among these ignition operations, the ignition operation performed at time t1 is the ignition operation performed near top dead center of the exhaust stroke, and the ignition operation performed at time t4 is the ignition operation performed at the normal ignition position near top dead center of the compression stroke. The spark generated in the spark plug 1 by the ignition operation performed at time t1 is regarded as a discard spark that does not contribute to the operation of the engine.

When the primary current i1 is interrupted at time t1 at which the piston reaches near top dead center in the exhaust stroke of the engine, a primary voltage v1 is induced in the primary coil of the ignition coil, as shown in FIG. 5B. This voltage is boosted to induce a high voltage for ignition in the secondary coil of the ignition coil, and a voltage proportional to and lower than the high voltage for ignition is induced in the second coil portion 2b2 of the secondary coil of the ignition coil. The voltage at both ends of the second coil portion 2b2 is detected as the secondary detection voltage v2 through the tap 2t.

Of the primary voltage v1 of the ignition coil and the secondary detection voltage v2 detected through the tap 2t, the primary voltage v1 exhibits a spike-form waveform S at the time of rising, and thereafter presents a waveform that changes in a substantially sinusoidal shape. The secondary detection voltage v2 detected through the tap rises while showing a substantially sinusoidal change without including the spike-form waveform. When the high voltage for ignition induced in the secondary coil of the ignition coil at time t2 reaches the breakdown voltage of the spark plug 1, the insulation between discharge gap of the spark plug 1 is broken down, and the secondary current i2 flows through the secondary coil of the ignition coil in the manner shown in FIG. 5(D). The secondary voltage of the ignition coil thereby decreases, and the secondary detection voltage v2 detected through the tap 2t therefore decreases.

When the energy stored in the ignition coil at time t3 falls to a level or lower than required for maintaining discharge in the spark plug, the discharge stops and the secondary current i2 becomes zero. The secondary voltage of the ignition coil and the secondary detection voltage v2 detected through the tap 2t slightly increases after the discharge has stopped, and then decreases toward zero after the peak value has been exhibited. The waveform of the primary voltage v1 of the ignition coil that appeared at time t2 and thereafter is a waveform that resembles the waveform of the secondary voltage that appears at time t2 and thereafter.

When the primary current i1 is interrupted at time t4 at which the piston reaches near top dead center in the compression stroke of the engine, a primary voltage v1 is induced in the primary coil of the ignition coil, as shown in FIG. 5B. This voltage is boosted to induce a high voltage for ignition in the secondary coil 2b, and a second detection voltage v2 proportional to the high voltage for ignition is induced in the second coil portion 2b2 of the secondary coil of the ignition coil (see FIG. 5C). When the high voltage for ignition at both ends of the secondary coil 2b at time t5 reaches the breakdown voltage of the spark plug 1, the insulation between discharge gap of the spark plug 1 is broken down, the secondary current i2 therefore flows in the manner shown in FIG. 5(D), the voltage at both ends of the secondary coil 2b decreases, and the secondary detection voltage v2 detected through the tap 2t decreases.

When the energy stored in the ignition coil at time t6 falls below the level required for maintaining discharge in the spark plug, the discharge stops and the secondary current i2 becomes zero. The secondary voltage of the ignition coil and the secondary detection voltage v2 detected through the tap 2t slightly increases after the discharge has stopped, and then decreases toward zero after the peak value has been exhibited. The waveforms of the primary voltage v1, the secondary detection voltage v2, and the secondary current i2 in the period from time t4 to t6 are approximate to the waveforms of the primary voltage v1, the secondary voltage v2, and the secondary current i2 in the period from time t1 to t3.

When a comparison is made of the waveforms of the primary voltage v1, the secondary detection voltage v2 and the secondary current i2 detected when the ignition operation is performed in the exhaust stroke, and the primary voltage v1, the secondary detection voltage v2, and the secondary current i2 detected when the ignition operation is performed in the compression stroke, the peak value v1$p$' of the primary voltage v1 generated at time t2 is less than the peak value v1$p$ of the primary voltage generated at time t5. Also, the peak value v2$p$' of the secondary detection voltage v2 generated at time t2 is less than the peak value v2$p$ of the secondary detection voltage v2 generated at time t5. Furthermore, the peak value i2$p$' of the secondary current i2 generated immediately after time t2 is greater than the peak value i2$p$ of the secondary current i2 generated immediately after time t5.

Also, the duration (discharge duration) Td' of the secondary current that flows when the ignition operation is performed in the exhaust stroke can be detected from the time starting from when the secondary detection voltage v2 shows a first peak P21 at time t2 and ending when the secondary detection voltage shows a second peak P22 at time t3, or starting from time t2 when the secondary current i2 starts to flow and ending at time t3 when the secondary current becomes zero. The discharge duration Td of the secondary current that flows when the ignition operation is performed in the compression stroke can be detected from the time starting from when the secondary detection voltage v2 shows the first peak P21 at time t5 and ending when the secondary detection voltage shows a second peak P22 at time t6, or starting from time t5 when the secondary current i2 starts to flow and ending at time t6 when the secondary current becomes zero. Comparing the durations Td' and Td of these secondary currents, it is apparent that the duration Td' of the secondary current flowing when the ignition operation is performed in the exhaust stroke is greater than the duration Td of the secondary current flowing when the ignition operation is performed in the compression stroke.

As described above, a difference can be seen between the waveforms of the primary voltage v1, the secondary detection voltage v2 and the secondary current i2 detected when the ignition operation is performed in the exhaust stroke, and the primary voltage v1, the secondary detection voltage v2, and the secondary current i2 detected when the ignition operation is performed in the compression stroke, and it is therefore possible to detect a parameter that shows the characteristics of these waveforms as the stroke determination parameter, and to compare the detected parameter to establish whether the engine stroke was the exhaust stroke or the compression stroke when an ignition operation has been performed.

As shown in FIG. 5(B), the primary voltage v1 of the ignition coil has a spike waveform S at rising, which is not easy to distinguish from the peak P11 that occurs subsequent to the spike waveform. In contrast, the waveforms of the secondary detection voltage v2 and the secondary current i2 detected through the tap on the secondary side of the ignition coil do not include spike waveforms, and waveforms showing characteristic portions of the waveforms of the secondary detection voltage v2 and the secondary current i2 detected through the tap on the secondary side of the ignition coil are therefore preferably used as the stroke determination parameters. It is possible to use the peak value of each waveform, the time interval between a plurality of peak values, or other characteristic as the parameter indicating the characteristic portion of each waveform.

As described above, when a current-interrupting ignition device is used as the ignition device for ignition in the engine, the second coil portion 2$b$2 is provided so that the waveform of the voltage at both ends of the second coil portion 2$b$2 of the secondary coil of the ignition coil 2 is used as a waveform that approximates the waveform of the voltage at both ends of the secondary coil 2$b$ of the ignition coil, and the parameter detection means 6$a$ for stroke determination can be configured so as to detect, as the stroke determination parameter, the first peak values v2$p$', v2$p$ that appear in the waveform of the voltage at both ends of the second coil portion 2$b$2 detected through the tap 2$t$ each time engine ignition is performed.

In this case, the stroke determination means 6$b$ can be configured so as to perform a parameter-establishing process for establishing whether, each time engine ignition is performed, the value of the stroke determination parameter newly detected in the present cycle by the parameter detection means 6$a$ for stroke determination exceeds the value of the stroke determination parameter detected in the previous cycle, and when the value of the stroke determination parameter detected in the present cycle is established by the parameter-establishing process to be in excess of the value of the stroke determination parameter detected in the previous cycle, the stroke carried out when the engine ignition is performed in the present cycle is established to be the compression stroke.

When a current-interrupting ignition device such as that shown in FIG. 2 is used as the ignition device for engine ignition, the second coil portion 2$b$2 is provided so that the waveform of the voltage at both ends of the second coil portion 2$b$2 of the secondary coil of the ignition coil is used as a waveform that approximates the waveform of the voltage at both ends of the secondary coil 2$b$ of the ignition coil, and the parameter detection means 6$a$ for stroke determination can be configured so as to detect, as the stroke determination parameter, the time Td, Td' that starts when the secondary detection voltage v2 detected through the tap 2$t$ provided to the secondary coil of the ignition coil shows the first peak P21 and ends when the secondary detection voltage shows the second peak P22. In this case, the stroke determination means 6$b$ can be configured so as to perform a parameter-establishing process for establishing whether, each time an ignition operation is performed in the cylinders of the engine, the value of the stroke determination parameter detected in the present cycle by the parameter detection means for stroke determination is less than the value of the stroke determination parameter detected in the previous cycle, and when the value of the stroke determination parameter detected in the present cycle is established by said parameter-establishing process to be less than the value of the stroke determination parameter detected in the previous cycle, the stroke carried out when the ignition operation is carried out in the cylinders in the present cycle is established to be the compression stroke.

When a current-interrupting ignition device is used as the ignition device for engine ignition, the second coil portion 2$b$2 of the secondary coil of the ignition coil is provided so that the waveform of the voltage at both ends of the second coil portion 2$b$2 of the secondary coil of the ignition coil is used as a waveform that approximates the waveform of the current i2 flowing through the secondary coil of the ignition coil, and the parameter detection means 6$a$ for stroke determination can also be configured so as to detect, as the stroke determination parameter, a peak value of the voltage at both ends of the second coil portion detected through the tap each time an ignition operation is carried out in the cylinders of the engine. In this case, the stroke determination means 6b can be configured so as to perform a parameter-establishing process for establishing whether, each time an ignition is performed in the cylinders of the engine, the value of the stroke determination parameter detected in the present cycle by the parameter detection means 6a for stroke determination is less than the value of the stroke determination parameter detected in the previous cycle, and when the value of the stroke determination parameter detected in the present cycle is established by said parameter-establishing process to be less than the value of the stroke determination parameter detected in the previous cycle, the stroke carried out when the ignition operation is carried out in the cylinders in the present cycle is established to be the compression stroke.

When a current-interrupting ignition device such as shown in FIG. 2 is used as the ignition device for engine ignition, the second coil portion 2b2 of the secondary coil of the ignition coil is provided so that the waveform of the voltage at both ends of the second coil portion 2b2 of the secondary coil of the ignition coil is used as a waveform that approximates the waveform of the current i2 flowing through the secondary coil of the ignition coil, and the parameter detection means 6a for stroke determination can also be configured so as to detect, as the stroke determination parameter, a peak value of the voltage at both ends of the second coil portion detected through the tap 2t each time an ignition is carried out in the engine. In this case, when the value of the stroke determination parameter newly detected in the present cycle is less than the value of the stroke determination parameter detected in the previous cycle, the stroke determination means 6b can be configured so as to establish whether the stroke carried out at the time of the current engine ignition is the compression stroke.

In any method for stroke determination, in order to accurately determine the stroke, the stroke determination means 6b is preferably configured so as to finalize the results of stroke determination when it has been confirmed that the stroke performed during ignition operation in the cylinders has been established to be the compression stroke a fixed number of times.

Figure 6:
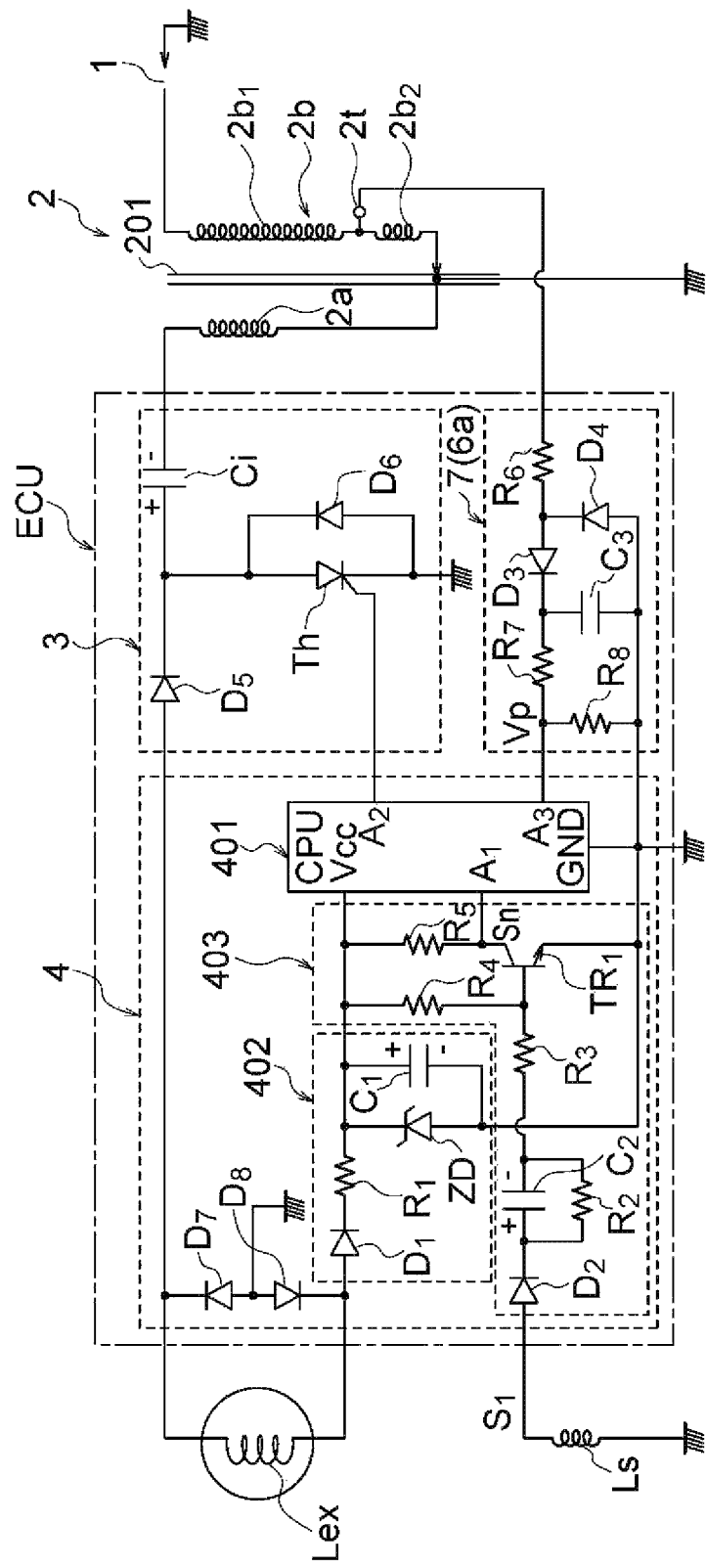
FIG. 6 is a circuit diagram showing another configuration example of the ignition device for a four-stroke engine in which the stroke determination device of the present invention has been incorporated.

In the embodiment shown in FIG. 2, a current-interrupting ignition device is used as the ignition device for engine ignition, but the present invention may be applied to the case in which a capacitor discharge ignition device is used as the ignition device. Referring to FIG. 6, a hardware configuration example of an embodiment is shown for the case in which a capacitor discharge ignition device is used as an ignition device for ignition in the engine. In the example shown in FIG. 6, the ignition coil 2 is disposed inside a magneto generator driven by the engine, and an exciter coil Lex disposed inside the magneto generator is used as a power source for charging the ignition capacitor. Also, in this embodiment, a signal coil Ls for generating a rotation signal sn for detecting engine rotation is disposed inside the magneto generator in which the ignition coil 2 and the exciter coil Lex are disposed.

The ignition circuit 3 for controlling the primary current of the ignition coil 2 comprises: an ignition capacitor Ci connected at one end to the non-grounded terminal of the primary coil 2a of the ignition coil; a diode D5 having a cathode connected to the other end of the ignition capacitor Ci and an anode connected to one end of the exciter coil Lex; a discharge thyristor Th having an anode connected to a connection point between the ignition capacitor Ci and the diode 5, and a cathode that is grounded; and a diode D6 connected in parallel between the anode and the cathode of the thyristor Th with the anode facing the cathode side of the thyristor Th.

The ignition timing control unit 4 is furthermore provided with: a diode D7 whose cathode is connected to one end of the exciter coil Lex, with the anode of the diode D1 being connected to the other end of the exciter coil Lex; and a diode D8 whose anode is connected to the anode of the diode D7 and whose cathode is connected to the other end of the exciter coil Lex. The configuration is otherwise the same as the ignition timing control unit 4 shown in FIG. 2, and the gate of the thyristor Th of the ignition circuit is connected to the port A2 of the microcomputer 401. The microcomputer 401 computes the engine rotational speed from the occurrence interval of the rotation signal sn inputted from the signal coil Ls by way of the signal input circuit 403, and computes the ignition timing of the engine with respect to the computed rotational speed. The microcomputer 401 also applies a trigger signal (ignition signal) to the gate of the thyristor Th from the port A2 when the computed ignition timing has been detected.

The voltage detection circuit 7 constituting the parameter detection means 6a for stroke determination is configured in similar fashion to the embodiment shown in FIG. 2, and the peak value of the voltage at both ends of the secondary coil 2b of the secondary coil of the ignition coil is detected through the tap 2t. The microcomputer 401 constitutes a stroke determination means by which a program stored in ROM is executed to thereby establish whether an engine stroke is the exhaust stroke or the compression stroke when an engine ignition operation is performed, on the basis of the stroke determination parameter detected by way of the voltage detection circuit 7.

In the ignition device shown in FIG. 6, when the exciter coil Lex induces a half-wave voltage of one polarity, the ignition capacitor Ci is charged to the illustrated polarity by a capacitor charging circuit comprising a closed circuit composed of the exciter coil→diode D5→ignition capacitor Ci→primary coil 2a of the ignition coil→diode D8→exciter coil Lex. Next, the microcomputer 401 applies a trigger signal to the gate of the thyristor Th at the ignition timing of the engine, and the thyristor Th is therefore switched on, and the charge stored in the ignition capacitor Ci is discharged by way of a capacitor discharge circuit comprising a closed circuit composed of the ignition capacitor Ci→thyristor Th→primary coil 2a of the ignition coil→ignition capacitor Ci. An oscillating voltage is thereby induced in the primary coil of the ignition coil, and the oscillating voltage is boosted by a boost ratio between the primary and secondary portions of the ignition coil to induce a high voltage for ignition in the secondary coil of the ignition coil. This high voltage is applied to the spark plug 1, and a discharge therefore occurs in the spark plug 1 to bring about engine ignition.

Figure 7:
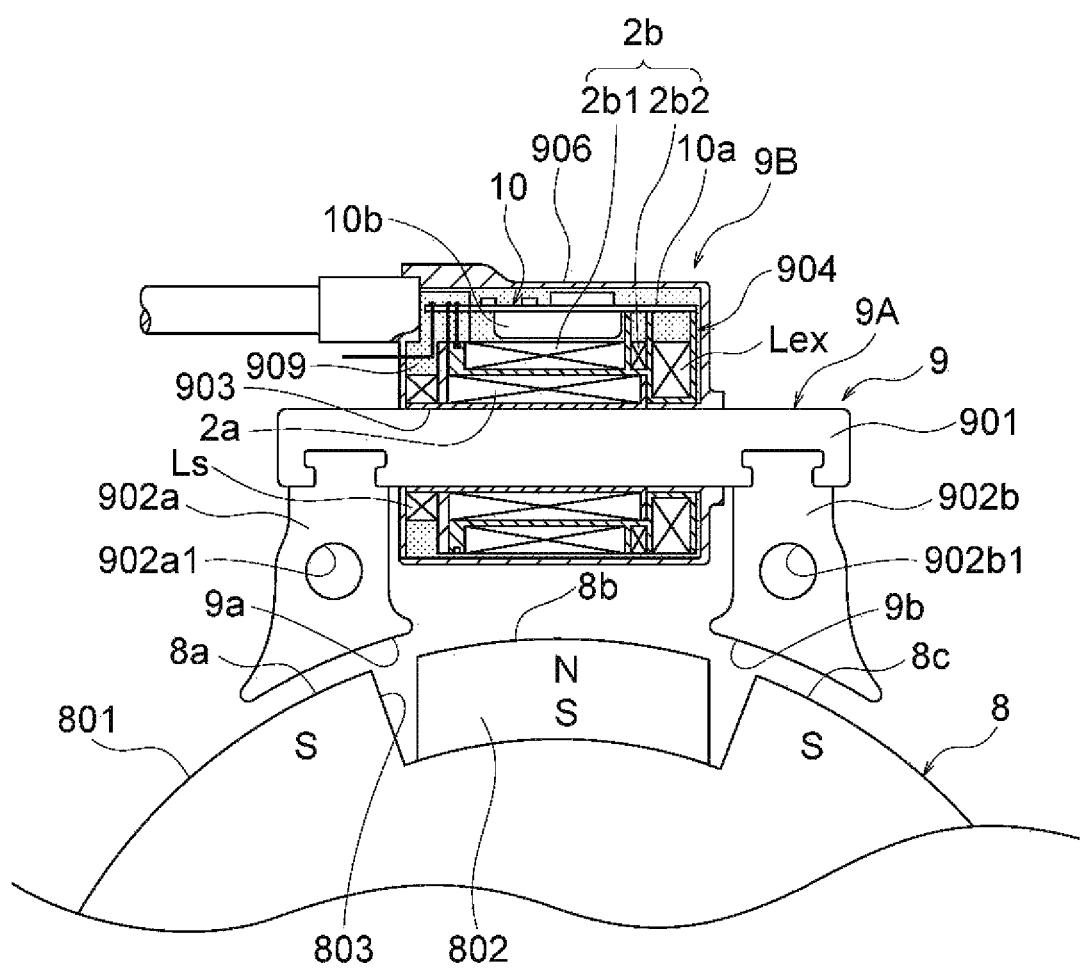
FIG. 7 is a cross-sectional view of a half portion showing a configuration example of a magneto generator used in the ignition device of FIG. 6.

Referring to FIG. 7, a configuration example of an external-magnet-type magneto generator provided with an ignition coil 2, an exciter coil Lex, and a signal coil Ls is shown. The magneto generator shown in FIG. 7 is configured from a magnetic rotor 8 and a stator 9. The magnetic rotor 8 is configured from a flywheel 801 mounted on the crankshaft of the engine (not shown), and a permanent magnet 802 mounted on the external peripheral part of the flywheel 801. At least the outer peripheral portion of the flywheel 801 is made of a ferromagnetic material such as iron, a recess 803 is formed on the external peripheral portion, and an arcuate permanent magnet 802 is secured inside the recess 803 by adhesion or the like. The permanent magnet 802 is magnetized in the radial direction of the flywheel 801, and a three-pole magnet field is formed at the external peripheral portion of the flywheel by three magnetic poles consisting of a magnetic pole (N pole in the illustrated example) 8b on the external peripheral side of the permanent magnet 802, and magnetic poles (S pole in the illustrated example) 8a and 8c drawn out from the internal peripheral side of the permanent magnet 802 to the external peripheral portion of the flywheel on both sides of a recess 203.

The stator 9 is made of a laminate of steel plates and includes an armature core 9A having magnetic pole portions 9a and 9b at both ends facing the magnetic poles 8a to 8c of the magnet field, and a coil unit 9B wound around the armature core 9A. In the present embodiment, an electronic unit 10 constituting the engine ignition device is integrated with the coil unit 9B.

The armature core 9A is configured so as to present what is substantially a U-shape by an I-shaped coil winding portion 901 and a pair of salient pole portions 902a and 902b coupled to both ends of the coil winding portion 901. The magnetic pole portions 9a and 9b are formed at the tips of salient pole portions 902a and 902b, respectively, and these magnetic pole portions are caused to face the external peripheral surface on which magnetic poles 8a to 8c of the magnet field of magnet rotor 8 are provided via a gap.

The coil unit 9B has, housed in a case 906, a primary bobbin 903 provided so as to surround the coil winding portion 901 of the armature core 9A, a primary coil 2a and a signal coil Ls of the ignition coil wound around the primary bobbin 903, a secondary bobbin 904 mounted on the armature core 9A with the main part of the primary bobbin 903 housed inside, a plurality of coils wound around the secondary bobbin 904, and an electronic unit 10 disposed outside of the coil wound around the secondary bobbin 904, the coil unit having a structure in which the components housed in the case 906 are molded with an insulating resin 909 filled in the case 906. The first coil portion 2b1 and the second coil portion 2b2 of the secondary coil 2b of the ignition coil, and an exciter coil Lex are wound on the secondary bobbin 904.

In the present embodiment, the first coil portion 2b1 and the second coil portion 2b2 constituting the secondary coil 2b of the ignition coil are formed by continuously winding a single conductor. The second coil portion 2b2 has fewer windings than does the first secondary coil 2b1, and a tap 2t (not shown in FIG. 7) is drawn out from the boundary part between the two coil portions.

In the illustrated example, the exciter coil Lex is wound around the secondary bobbin, but it is also possible for the exciter coil to be wound around the primary bobbin.

The electronic unit 10 is configured by mounting, on a circuit board 10a, an electronic component 10b constituting the electronic circuit portion of the engine ignition device, and is secured to a collar of the secondary bobbin 904 by adhesion or other suitable means.

The armature core 9A is disposed in a state in which the lengthwise direction of the coil winding portion 901 thereof faces the axial direction of the case 906, and the stator 9 is configured from the armature core 9A and the coil unit 9B.

In the present embodiment, the engine has a single cylinder, but when the engine is a multi-cylinder engine, the stator 9 is provided for each cylinder of the engine, and an ignition operation is performed in each cylinder as the magnetic pole portions 8a to 8c of the magnet rotor 8 pass the position of the magnetic pole portions 9a and 9b of the stator 9 provided to each cylinder. Each stator 9 is disposed at a position suitable for causing an ignition operation to be performed in the corresponding cylinder, and is secured to a stator-mounting portion provided to a case or the like of the engine.

In the example shown in FIG. 7, mounting holes 902a1 and 902b1 are provided through the salient pole portions 902a and 902b of the armature core, respectively, and the stator 9 is fastened to the stator mounting portion by screws provided through the mounting holes. With the stator 9 secured to the stator mounting portion, the magnetic pole portions 9a and 9b formed at the tips of the salient pole portions 902a and 902b are made to face, via a gap, the area of the external peripheral portion of the rotor 8 where the magnetic poles 8a to 8c are provided.

Figure 8:
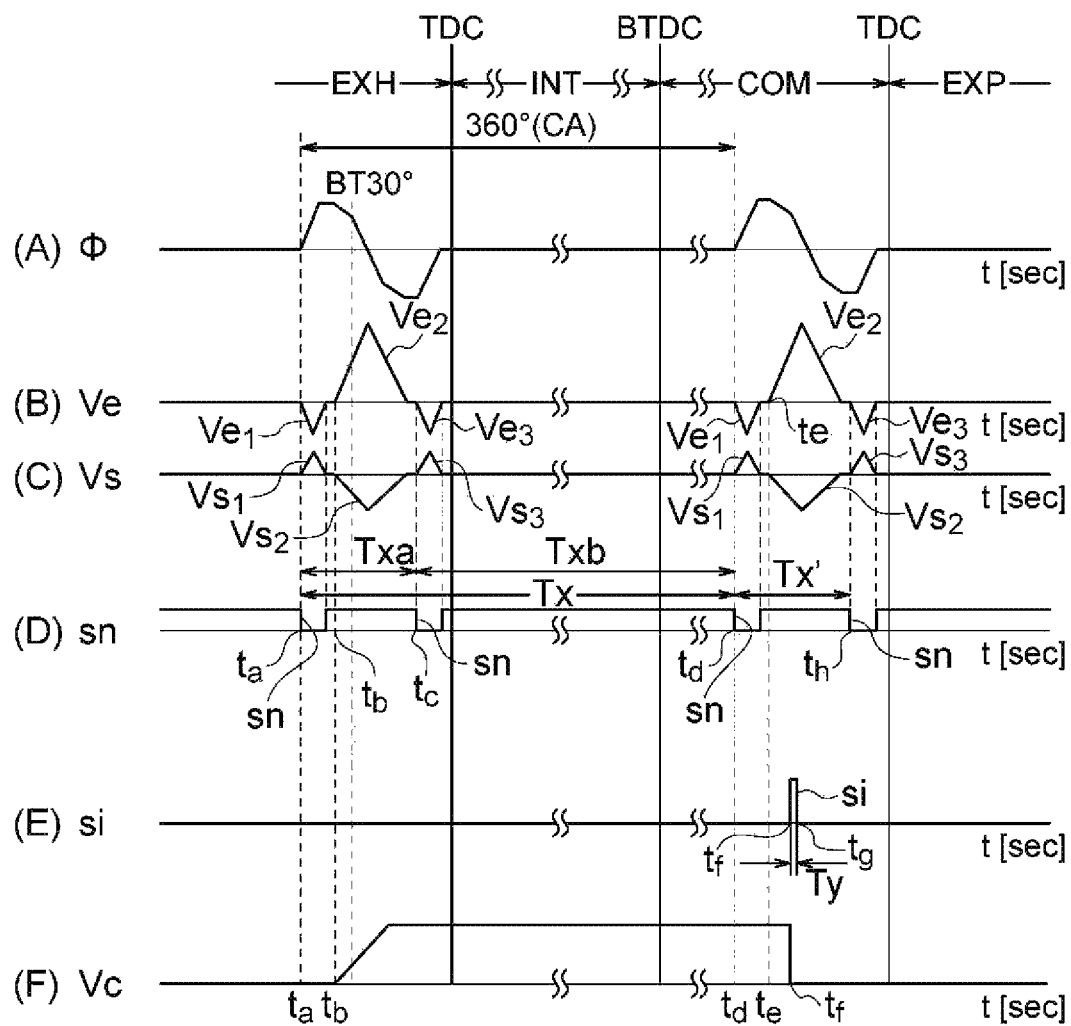
FIG. 8 is a waveform diagram showing a waveform of magnetic flux flowing through the armature core of the magneto generator of FIG. 7, a waveform of voltage induced in an exciter coil and a signal coil in accompaniment with change in the magnetic flux, a waveform of a trigger signal imparted to a discharge thyristor provided inside the ignition device shown in FIG. 6, and a waveform of voltage at both ends of an ignition capacitor.

Referring to FIG. 8, the waveform of magnetic flux $\phi$ flowing in the armature core of the magneto generator and the voltage waveform of each part of the ignition device shown in FIG. 6 are shown with respect to time t. FIG. 8(A) shows the waveform of the magnetic flux $\phi$, and FIGS. 8(B) and (C) show the waveforms of voltages Ve and Vs induced in the exciting coil Lex and the signal coil Ls, respectively. FIG. 8(D) shows the signal sn inputted from the signal input circuit 403 to the microcomputer 401, and FIGS. 8(E) and (F) show the trigger signal si applied to the thyristor Th and a voltage Vc at both ends of the ignition capacitor Ci, respectively.

The symbols EXH, INT, COM, and EXP shown at the top of FIG. 8 indicate the exhaust stroke, intake stroke, compression stroke, and expansion stroke, respectively, of the engine, and TDC and BTDC indicate the times when the engine piston reaches top dead center and the time when the piston reaches the bottom dead center.

In the illustrated magneto generator, a change such as shown in FIG. 8(A) occurs in the magnetic flux $\phi$ flowing in the armature core 9A in the process of a single rotation of the magnet rotor 8. Due to the change of the magnetic flux, a first half-wave voltage Ve1 and a second half-wave voltage Ve2 with reverse polarity to the first-half wave voltage, and a third half-wave voltage Ve3 with the same polarity as the first half-wave voltage Ve1 are sequentially induced in the exciter coil Lex, as shown in FIG. 8(B).

In the example shown in FIG. 8, the first half-wave voltage Ve1 and the third half-wave voltage Ve3 induced in the exciter coil Lex is shown to comprise negative voltages, and the second half-wave voltage Ve2 is shown comprise a positive voltage, but the first half-wave voltage Ve1 and the third half-wave voltage Ve3 can be set to positive voltages and the second half-wave voltage Ve2 can be set to a negative voltage by reversing the winding direction of the exciter coil.

In the present embodiment, the signal coil Ls is disposed in the magneto generator shown in FIG. 7, and an AC voltage having a first half-wave voltage VS1 and a second half-wave voltage VS2 with reverse polarity to the first-half wave voltage VS1, and a third half-wave voltage Vs3 with the same polarity as the first half-wave voltage VS1 are induced in the signal coil Ls as well, as shown in FIG. 8(C).

As shown in FIG. 8D, when the first half-wave voltage VS1 induced in the signal coil Ls rises and when the third half-wave voltage Vs3 rises, a pulse waveform signal that falls in a stepwise fashion from the power supply voltage is obtained between the collector and emitter of the transistor TR1 of the rotation signal input circuit 403 shown in FIG. 6, and when the first half-wave voltage VS1 falls and when the third half-wave voltage Vs3 falls, a pulse waveform signal that rises in a stepwise fashion to the power supply voltage is obtained. Each fall of this signal is recognized as a rotation signal sn by the CPU of the microcomputer. In the example shown in FIG. 8, the rotation signal sn is recognized at times ta, tc, td, th, . . . .

The rotation signal input circuit 403 used in the present embodiment switches on the transistor TR1 and inputs the rotation signal sn to the port A1 of the microcomputer 401 at two crank angle positions: a crank angle position where the first half-wave voltage VS1 rises; and a crank angle position where the third half-wave voltage Vs3 rises, the half-wave voltages being generated by the signal coil Ls in a single rotation of the crankshaft. In the present embodiment, among these rotation signals sn, the rotation signal sn inputted to the microcomputer at the crank angle position where the signal coil Ls generates the first half-wave voltage VS1 is used as a reference signal, the crank angle position where this reference signal is generated is used as the reference position, and at this reference position, the ignition timer is caused to start a measuring operation for detecting ignition timing of the engine.

Each time the CPU of the microcomputer 401 recognizes the rotation signal sn, the CPU 401 performs processing to identify whether the rotation signal sn generated in the present cycle is the reference signal, and when the rotation signal sn generated in the present cycle is identified to be the reference signal, the time required for the crankshaft to rotate from the reference position to the ignition position at the rotational speed of the crankshaft at that time is computed as an ignition timing detection measurement time Tig. The CPU causes the timer to measure the ignition timing detection measurement time Tig, and applies a trigger signal (ignition signal) to the gate of the thyristor Th when the timer completes the measurement.

In the example shown in FIG. 8, when the exciter coil Lex induces the second half-wave voltage at time tb, the ignition capacitor Ci is charged by the capacitor charging circuit comprising a closed circuit composed of the exciter coil Lex→diode D5→ignition capacitor Ci primary coil 2a of the ignition coil→diode D8→exciter coil Lex, and the voltage Vc at both ends of the ignition capacitor Ci is boosted in the manner shown in FIG. 8(F). When the trigger signal Si is applied to the gate of the thyristor Th at time tf, the thyristor Th is switched on, and the charge stored in the ignition capacitor Ci is discharged by way of a capacitor discharge circuit comprising a closed circuit composed of the ignition capacitor Ci→thyristor Th→primary coil 2a of the ignition coil→ignition capacitor Ci. A high voltage for ignition is thereby induced in the secondary coil 2b of the spark plug 2, and the high voltage is applied to the spark plug 1 to cause the spark plug 2 to spark, whereby engine ignition occurs.

Next, various stroke determination parameters that can be detected from the waveform of the voltage detected through the tap 2t of the ignition coil 2 and the method for stroke determination using the detected stroke determination parameters will be described for the case in which a capacitor discharge ignition device such as shown in FIG. 6 is used as the ignition device for performing ignition in an engine.

Figure 9:
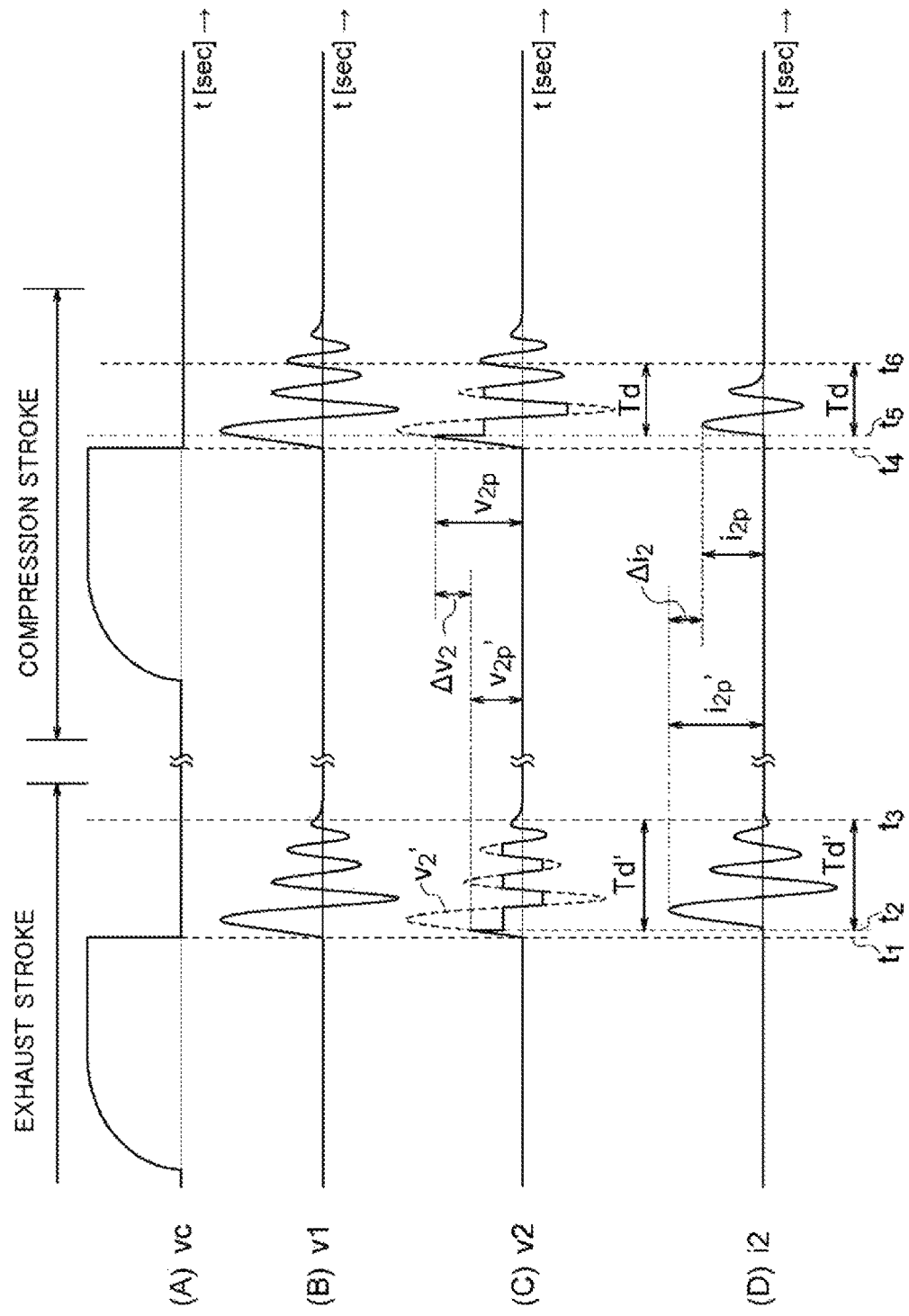
FIG. 9 is a waveform diagram schematically showing waveforms of the voltage and current detected in the primary side and secondary side of the ignition coil of the ignition device of FIG. 6.

FIG. 9 shows waveforms of the current and voltage detected in the primary side of the ignition coil and the waveforms of secondary detection voltage and secondary voltage detected through the tap 2t in the secondary side for the case in which a capacitor discharge circuit is used. FIGS. 9(A) and (B) show the waveforms of the voltage Vc at both ends of the ignition capacitor Ci and the voltage (primary voltage) v1 at both ends of the primary coil of the ignition coil 2, respectively, and FIGS. 9(C) and (D) show the waveforms of the secondary detection voltage v2 and the secondary current i2, respectively. The illustrated waveform of the secondary detection voltage v2 is the waveform of voltage detected though the tap 2t for the case in which the number of windings of the second coil portion 2b2 is set so that the waveform of the voltage waveform at both ends of the second coil portion 2b2 is made to approximate the voltage waveform at both ends of the secondary coil 2b. The waveform of the secondary current i2 is the waveform of voltage obtained though the tap 2t for the case in which the number of windings of the second coil portion 2b2 is set so that the waveform of the voltage at both ends of the second coil portion 2b2 is made to be a waveform that approximates the waveform of current flowing through the secondary coil 2b.

In the example shown in FIG. 9, the ignition signal is applied to the thyristor Th at time t1 and time t4 to perform an ignition operation. Among these ignition operations, the ignition operation performed at time t1 is the ignition operation performed near top dead center of the exhaust stroke, and the ignition operation performed at time t4 is the ignition operation performed at the normal ignition position near top dead center of the compression stroke.

When the thyristor Th is switched on at time t1 when the piston reaches near top dead center in the exhaust stroke of the engine and the charge stored in the ignition capacitor is discharged through the primary coil of the ignition coil, a primary voltage v1 is induced in the primary coil of the ignition coil, and this voltage is boosted to induce a high voltage for ignition in the secondary coil 2b of the ignition coil, as shown in FIG. 9(B). The voltage v2' shown in FIG. 9(C) represents the secondary detection voltage detected through the tap 2t of the secondary coil 2b of the ignition coil at this time. When the high voltage for ignition induced in the secondary coil of the ignition coil reaches the breakdown voltage or greater of the spark plug, the insulation between the discharge gap of the spark plug is broken down, and the secondary current i2 therefore flows through the secondary coil of the ignition coil in the manner shown in FIG. 9(D). The voltage at both ends of the secondary coil of the ignition coil (voltage at both end of the spark plug) thereby decreases, and the secondary detection voltage v2 detected through the tap therefore decreases.

It is apparent from FIG. 9 that when a capacitor discharge ignition device is used, the stroke can be determined using the first peak value appearing in the waveform of the secondary detection voltage v2 detected through the tap 2t as the stroke determination parameter, and using the fact that the first peak value v2p' of the secondary detection voltage v2 detected in the exhaust stroke is less than the first peak value v2p of the secondary detection voltage v2 detected in the compression stroke by an amount Δv2. Also, the stroke can be determined using the first peak value of secondary current i2 as the stroke determination parameter, and using the fact that the first peak value i2p' of secondary current i2 detected in the exhaust stroke is greater than the first peak value i2p of the secondary current i2 detected in the compression stroke by an amount Δi2.

The stroke can also be determined using durations Td' and Td of the secondary current i2 as a stroke determination parameter, and using the fact that the duration Td' of the secondary current i2 detected in the exhaust stroke is longer that the duration Td of the secondary current i2 detected in the compression stroke. However, when consideration given to ease and accuracy of determination, it is preferred that, when a capacitor discharge ignition device is used, the first peak values v2p', v2p appearing in the waveform of the secondary detection voltage v2 be used as the stroke determination parameter, or that the first peak values i2p', i2p of the secondary current i2 be used as the stroke determination parameter.

In other words, when a capacitor discharge ignition device is used as the ignition device for ignition in the engine, the second coil portion 2b2 is provided so that the waveform of the voltage at both ends of the second coil portion 2b2 of the secondary coil of the ignition coil is used as a waveform that approximates the waveform of the voltage at both ends of the secondary coil of the ignition coil, and the parameter detection means 6a for stroke determination can be configured so as to detect, as the stroke determination parameter, the first peak values v2p' and v2p that appear in the waveform of the voltage at both ends of the second coil portion 2b2 detected through the tap 2t each time engine ignition is performed. In this case, the stroke determination means 6b can be configured so as to perform a parameter-establishing process for establishing whether, each time engine ignition is performed, the value of the stroke determination parameter newly detected in the present cycle by the parameter detection means for stroke determination exceeds the value of the stroke determination parameter detected in the previous cycle, and when the value of the stroke determination parameter detected in the present cycle is established by the parameter-establishing process to be in excess of the value of the stroke determination parameter detected in the previous cycle, the stroke carried out when the engine ignition is performed in the present cycle is established to be the compression stroke.

When a capacitor discharge ignition device is used as the ignition device for engine ignition, the second coil portion 2b2 of the secondary coil of the ignition coil is provided so that the waveform of the voltage at both ends of the second coil portion 2b2 of the secondary coil of the ignition coil is used as a waveform that approximates the waveform of the current flowing through the secondary coil of the ignition coil, and the parameter detection means 6a for stroke determination can be configured so as to detect, as the stroke determination parameter, a first peak values i2p', i2p that appear in the waveform of the voltage at both ends of the second coil portion 2b2 detected through the tap 2t each time engine ignition is carried out.

In this case, the stroke determination means 6b can be configured so as to perform a parameter-establishing process for establishing whether, each time an ignition operation is performed in the cylinders of the engine, the value of the stroke determination parameter detected in the present cycle by the parameter detection means 6a for stroke determination is less than the value of the stroke determination parameter detected in the previous cycle, and when the value of the stroke determination parameter detected in the present cycle is established by said parameter-establishing process to be less than the value of the stroke determination parameter detected in the previous cycle, the stroke carried out when the engine ignition operation is carried out in the present cycle is established to be the compression stroke.

When a capacitor discharge ignition device is used as the ignition device for engine ignition, in order to accurately determine the stroke, the stroke determination means 6b is preferably configured so as to finalize the results of stroke determination when it has been confirmed that the stroke performed during ignition operation in the cylinders has been established to be the compression stroke a fixed number of times.

The control of the ignition device shown in FIGS. 2 and 6 is carried out by causing the CPU of the microcomputer 401 to execute a predetermined program. Hereinbelow, the control of the ignition device performed by the microcomputer 401 will be described using the ignition device shown in FIG. 6 as an example.

Figure 10:
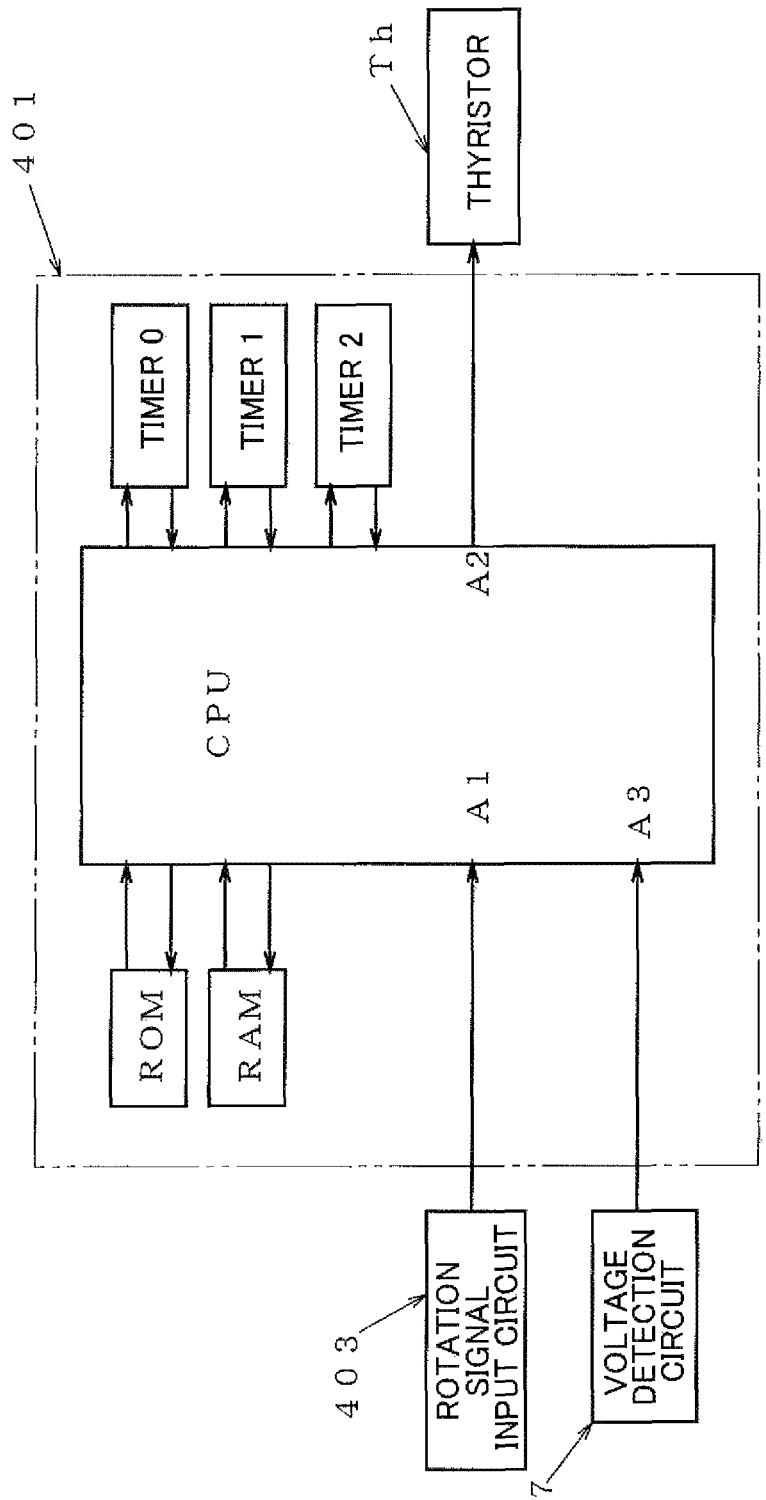
FIG. 10 is a block diagram showing a configuration of a microcomputer used in the ignition device of FIG. 6.

The microcomputer 401 is provided with a timer 0, a timer 1, and a timer 2 in addition to a CPU, a ROM, and a RAM, as shown in FIG. 10. The rotation signal sn is inputted to the port A1 of the CPU, and the output of the voltage detection circuit 7 is inputted to the port A3 of the CPU. The ignition signal is applied from the port A2 of the CPU to the thyristor Th.

Among the timers 0 to 2, timer 0 is used for measuring a time Ty until the insulation between discharge gaps of spark plug 1 breaks down after an ignition signal has been applied to the thyristor Th at the ignition timing, and the timer 1 is used for measuring the time Tig for detecting the ignition timing.

The timer 2 measures the interval at which the rotation signal sn is inputted to the microcomputer, and is controlled by the microcomputer CPU so as to repeat the action of being reset each time the rotation signal sn is generated and restarting the clocking operation. As shown in FIG. 8(D), the CPU reads the measurement value immediately prior to resetting the timer 2 to thereby detect: a time Txa that starts when the rotation signal sn occurs at the rise of the first half-wave voltage VS1 outputted by the signal coil Ls and ends when the rotation signal sn occurs at the rise of the third half-wave voltage Vs3; and a time Txb that starts when the rotation signal sn occurs at the rise of the third half-wave voltage Vs3 and ends when the rotation signal sn occurs at the rise of the subsequent first half-wave voltage VS1.

<Processing Executed by Microcomputer>

The microcomputer 401 causes the CPU to execute a predetermined program stored in ROM, and thereby constitutes function implementation means required for configuring the ignition timing control unit 4 and the stroke determination unit 6b. FIGS. 11 to 16 show an example of a flowchart showing an algorithm of a program to be executed by the CPU to configure the ignition timing control unit 4 and the stroke determination means 6b.

Figure 11:
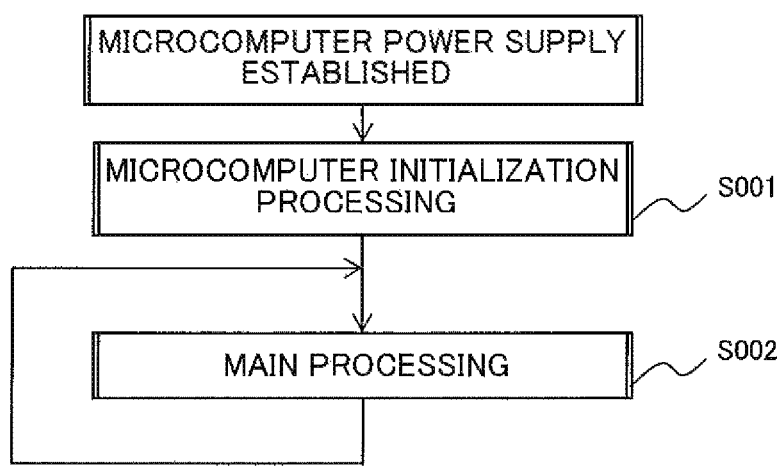
FIG. 11 is a flowchart showing a process executed by a microcomputer when a power supply of the microcomputer has been established, in order to configure the stroke determination device of the present invention.
Figure 12:
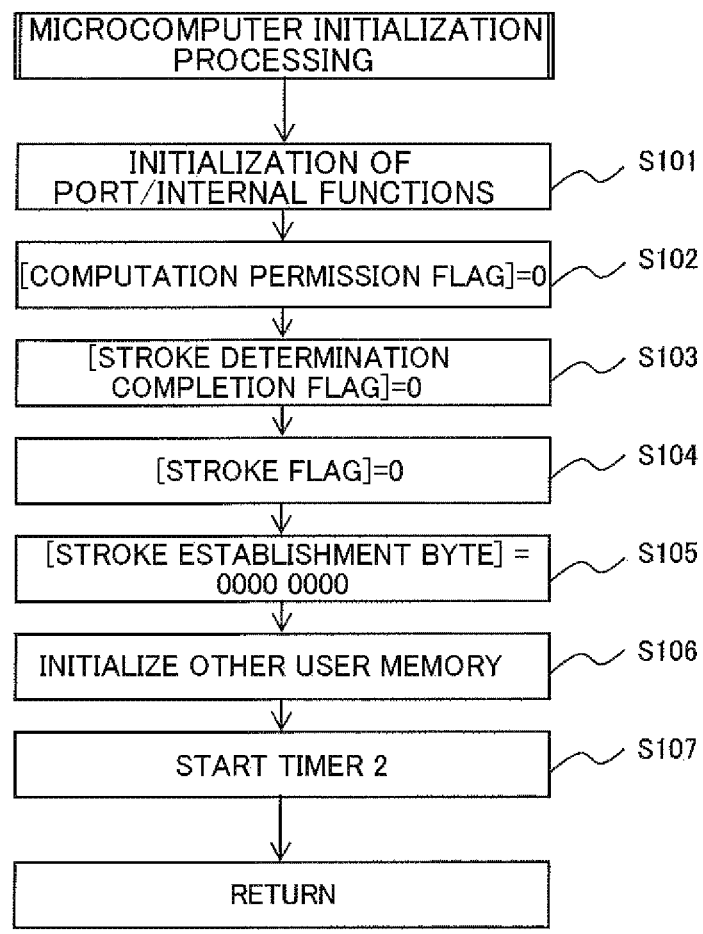
FIG. 12 is a flowchart showing an algorithm of a microcomputer initialization process executed by the microcomputer, in order to configure the stroke determination device of the present invention.
Figure 13:
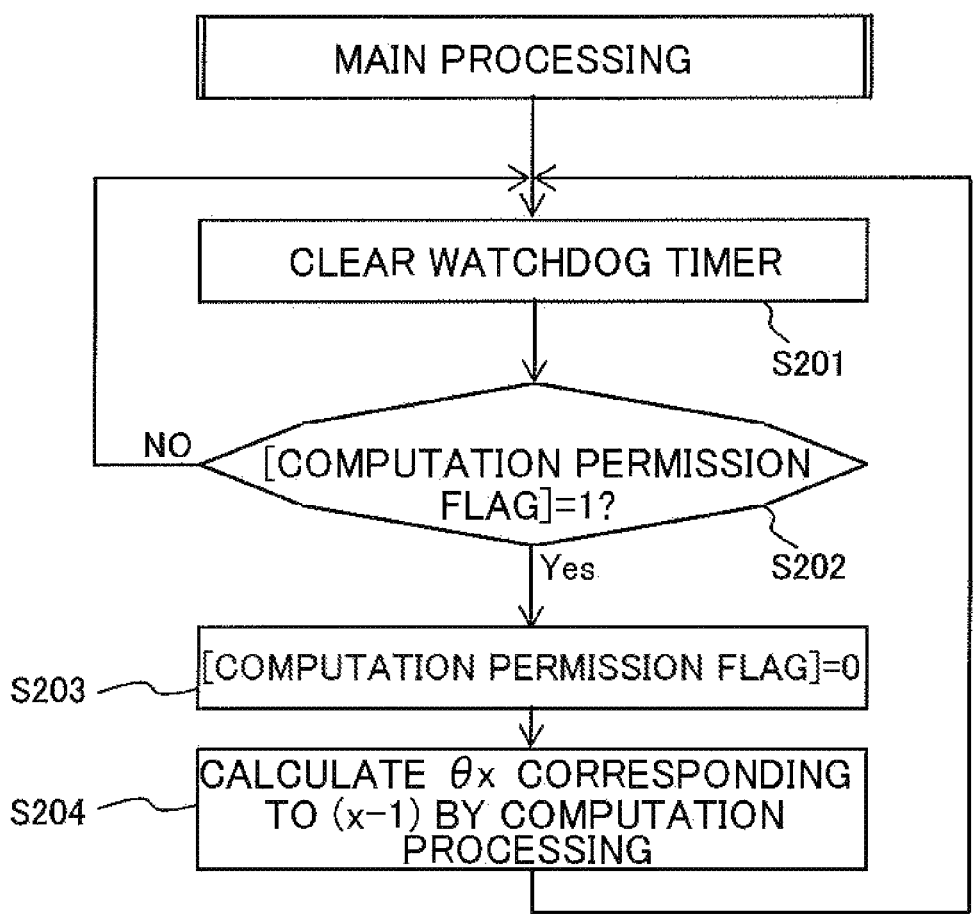
FIG. 13 is a flowchart showing an algorithm of a main process executed by the microcomputer in order to configure the stroke determination device of the present invention.
Figure 14:
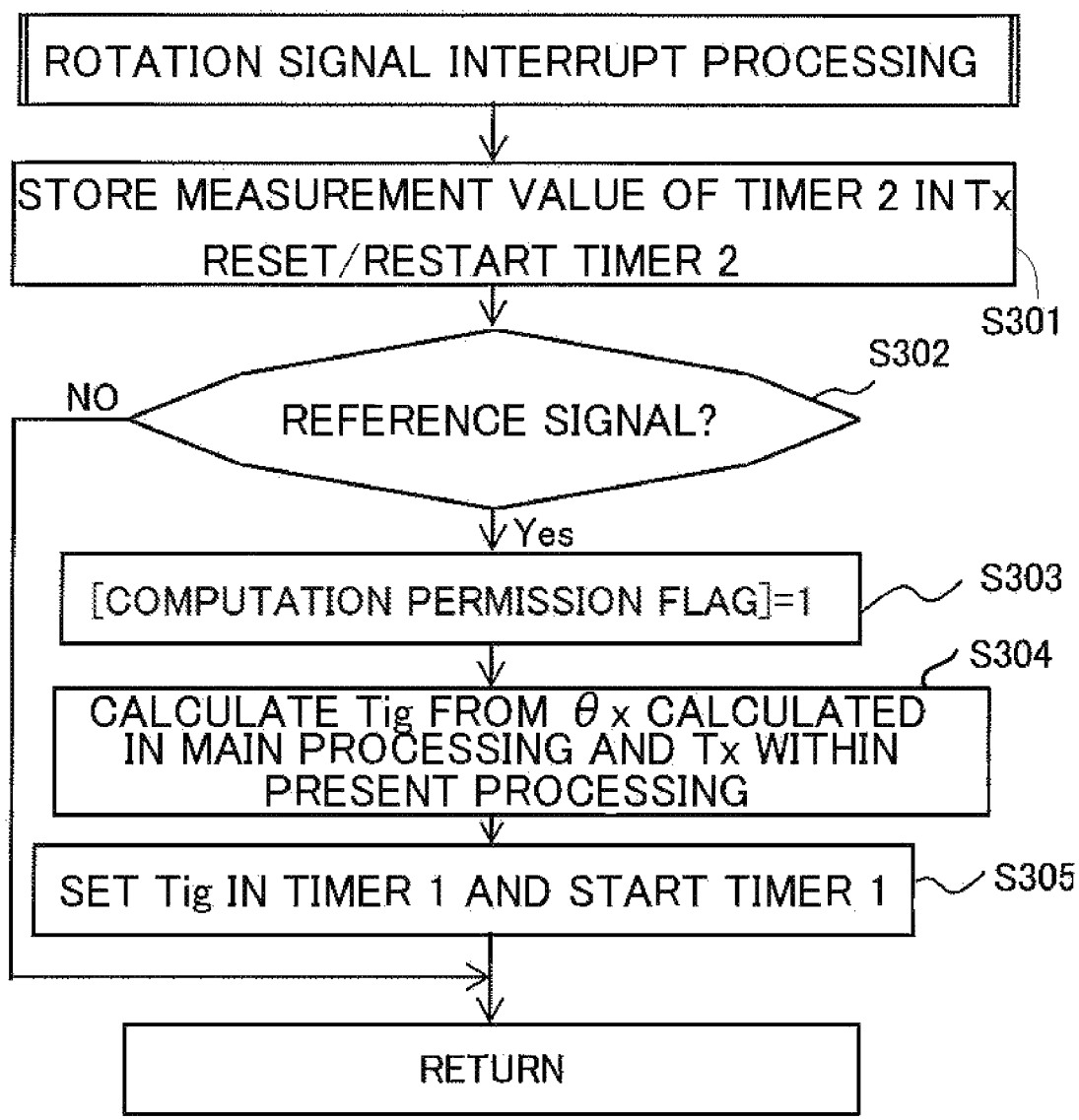
FIG. 14 is a flowchart showing an algorithm of a rotation signal interrupt process executed by a microcomputer in order to configure the stroke determination device of the present invention.
Figure 15:
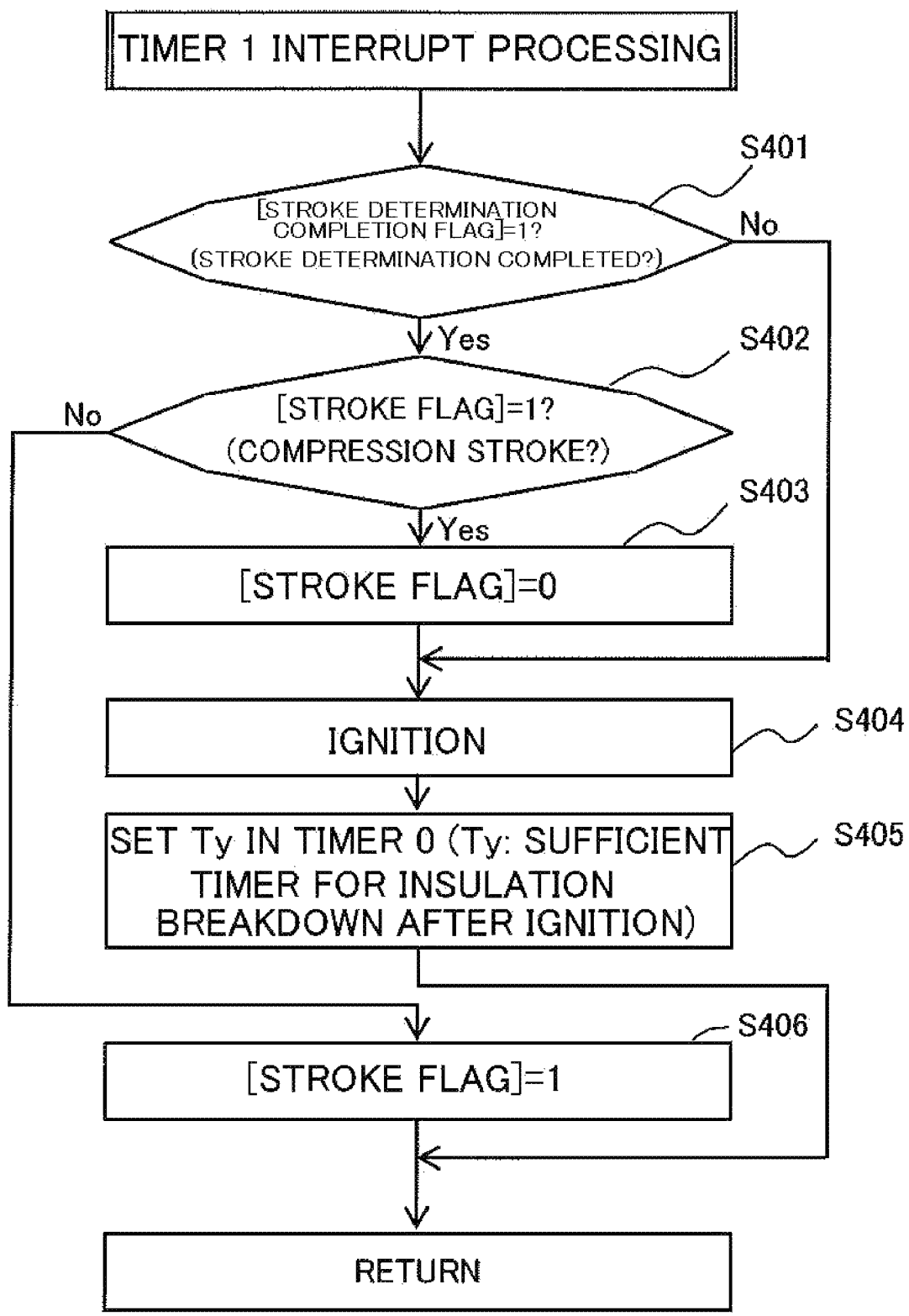
FIG. 15 is a flowchart showing an algorithm of a timer 1 interrupt process executed by the microcomputer in order to configure the stroke determination device of the present invention.
Figure 16:
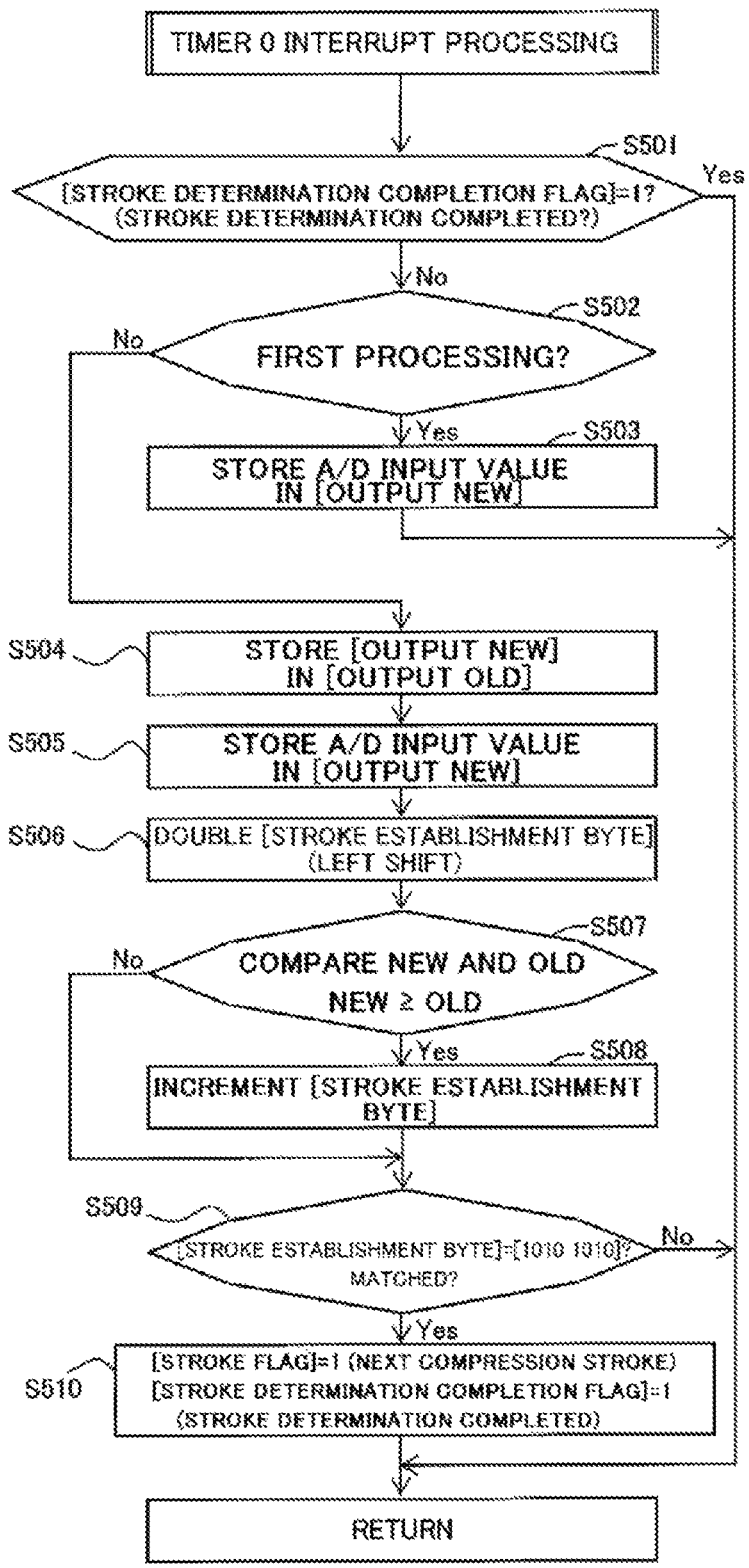
FIG. 16 is a flowchart showing an algorithm of a timer 0 interrupt process executed by the microcomputer in order to configure the stroke determination device of the present invention.

FIG. 11 is a flowchart schematically showing the flow of processing executed after the power supply of the microcomputer has been established, and FIG. 12 is a flowchart showing the flow of initialization processing first executed after the power supply of the microcomputer has been established. FIG. 13 is a flowchart showing an algorithm of main processing executed after the initialization processing of FIG. 12 has been completed, and FIG. 14 is a flowchart showing an algorithm of rotation signal interrupt processing executed each time the rotation signal sn is inputted to the port A1 of the microcomputer by way of the signal input circuit 403. Furthermore, FIG. 15 is a flowchart showing the flow of timer 1 interrupt processing executed when measurement of the time Tig set in the processing in FIG. 14 has been completed; and FIG. 16 is a flowchart showing the flow of timer 0 interrupt processing executed when measurement of time Ty set in the process in FIG. 15 has been completed.

Following the algorithm shown in FIGS. 11 to 16, the engine start operation is performed, and when the power supply of the microcomputer has been established, the initialization process (FIG. 12) of each part of the microcomputer is first carried out in step S001 of FIG. 11, and when the initialization process is completed, the main process (FIG. 13) shown in step S002 of FIG. 11 is carried out.

In the initialization process shown in FIG. 12, first, in step S101, each port of the CPU and various internal functions are initialized, and in steps S102, S103, and S104, the [computation permission flag], the [stroke determination completion flag], and the [stroke flag], respectively, are set to 0. Next, in step S105, the [stroke establishment byte] is set to [0000 0000]. Furthermore, in step S106, other user memory is initialized, and in step S107, the initialization processing is ended after the timer 2 has been started.

After the initialization processing of FIG. 12 has ended, the main processing in FIG. 13 is carried out. In the main processing, first, in step S201, the watchdog timer is cleared, and in step S202, it is established whether the [computation permission flag] has been set to 1. As a result, when it has been established that the [computation permission flag] has not been set to 1, the process returns to step S201, and when it has been determined that the [computation permission flag] has been set to 1, the process clears the [computation permission flag] to 0 in step S203, and then in step S204, computes the angle θx from the crank angle position (reference position) at which the reference signal occurred to the ignition position, which is the crank angle position for engine ignition, using the engine rotational speed information included in the measurement value Tx−1 of the previous cycle of the timer 2 read each time the rotation signal sn occurs. The angle θx is obtained, for example, by searching a map that gives the relationship between Tx−1 and θx, and performing a complementary computation.

The rotation signal interrupt processing shown in FIG. 14 is performed each time the rotation signal sn is generated. In this interrupt processing, first, in step S301, the measurement value of the timer 2 is read and stored in memory [Tx], and the timer 2 is reset and then restarted. Next, in step S302, it is identified whether the rotation signal sn of the current cycle is a reference signal. This identification is performed by determining whether the measured value of the timer read in the current cycle is greater than the measured value of the timer 2 read when the rotation signal was generated in the previous cycle. In other words, when the measurement value of the timer read in the current cycle is greater than the measurement value of the timer 2 read in the previous cycle, the rotation signal generated in the current cycle is identified as the reference signal generated at the reference position.

When the rotation signal is established to not be the reference signal as a result of identifying whether the rotation signal sn of the current cycle is a reference signal in step S302, the process is ended without performing any action. When the rotation signal sn of the current cycle has been identified in step S302 to be the reference signal, the process proceeds to step S303 and sets the [computation permission flag] to 1. Next, in step S304, the time required to rotate by the angle θx, to the ignition position from the current crank angle position at which the reference signal was generated is computed as the ignition timing detection measurement time Tig using Tx stored in memory in step S301. Next, in step S305, the ignition timing detection measurement time Tig is set in the timer 1, measurement is immediately started, and then the process returns to the main processing.

The timer 1 interrupt process shown in FIG. 15 is performed when measurement of the measurement value Tig for which the timer 1 was set is completed. In this interrupt process, it is established whether the stroke determination process has been completed or not by establishing whether the [stroke determination flag] is set to 1 or not in step S401. As a result, when it has been established that the [stroke determination flag] is set to 1 and established that the stroke determination process has been completed, the process proceeds to step S402, and it is established whether the current stroke is the compression stroke or not by establishing whether [stroke flag] is set to 1 or not. As a result, when it has been established that the [stroke flag] is set to 1 and established that the current stroke is the compression stroke, the process proceeds to step S403 and the [stroke flag] is cleared to 0. Next, in step S404, an ignition signal is generated to switch on the ignition switch, thereby causing the ignition capacitor to discharge and causing a spark discharge to be generated in the spark plug. Next, after the time Ty has been set in the timer 0 in step S405, the process is ended. The time Ty is the time required for the insulation of the discharge gap of the spark plug to be broken down after the ignition signal is generated and the discharge of the ignition capacitor Ci has started. When it has been established that the [stroke determination flag] has not been set to 1 and the stroke determination process has not yet been completed in step S402, the process proceeds to step S406, the [stroke determination flag] is set to 1, and the process returns to main processing.

When measurement of the measurement value Ty for which the timer 0 was set is completed after the ignition capacitor C1 has discharged, the timer 0 interrupt process shown in FIG. 16 is performed. In this interrupt process, first, it is established whether the stroke determination process has been completed by establishing whether the [stroke determination flag] is set to 1 in step S501. As a result, when it has been established that the [stroke determination completion flag] is set to 1 and established that the stroke determination has been completed, the process is ended without performing any action. When it is established in step S501 that the [stroke determination completion flag] is not set to 1 and established that the stroke determination has not been completed, the process proceeds to step S502 to establish whether the current process is the first process. In this establishment process, when it is established that the current process is the first process, the process proceeds to step S503, the output signal of the voltage detection circuit 7 is read from the port A3 (A/D input terminal) of the CPU, the read value is stored in [Output NEW], and this process is ended.

When it is established in step S502 that the current process is not the first process, the process proceeds to step S504, the content of [Output NEW] is stored in [Output OLD], and then the data inputted to the port A3 of the CPU in step S505 is stored in [Output NEW]. Next, in step S506, the [stroke establishment byte] is doubled (left-shifted), and the process then proceeds to step S507, and [Output NEW] and [Output OLD] are compared. As a result, when it is established that [Output NEW]≥[Output OLD], the process proceeds to step S508, the [stroke establishment byte] is incremented, and it is established whether [stroke establishment byte] matches [1010 1010] in step S509. As a result of this establishment process, when it is established that the [stroke establishment byte] does not match [1010 1010], then the process is ended without performing any action. When it is established in step S509 that the [stroke establishment byte] matches [1010 1010], the process proceeds to step S510, and the [stroke flag] is set to 1 so that establishing whether the engine stroke is the compression stroke is carried out when the next timer 0 interrupt process is carried out, and furthermore, the [stroke determination completion flag] is set to 1 in order to indicate that the stroke determination processing has been completed, and the process is ended. In step S507, it is established whether the value in the current cycle is equal to or greater than the value in the previous cycle, the process proceeds to step S508 even when the value in the current cycle is the same value as the value in the previous cycle, and the [stroke establishment byte] is incremented. However, this is a specification of convenience for reducing the number of steps.

In the case of the algorithm shown in FIGS. 11 to 16, the process carried out in step S302 of the process in FIG. 14 constitutes reference signal identification means. The process carried out in step S204 of the process in FIG. 13, and the process carried out in step S304 of the process in FIG. 14 constitute ignition timing computation means. Also, the process for executing steps S401 to S403, and S406 of the timer 1 interrupt process in FIG. 15, and the process for executing steps S501 to S510 of the timer 0 interrupt process in FIG. 16 constitute the stroke determination means 6b, and the process for executing step S305 of the rotation signal interrupt process in FIG. 14 constitutes timer 1 setting means. Furthermore, step S404 of the timer 1 interrupt process in FIG. 15 constitutes ignition signal generating means, and step S405 of the processing in FIG. 15 constitutes timer 0 setting means for setting timer 0.

Some embodiments of the present invention are described above, but the present invention is not limited to the above-described embodiments; it shall be apparent that various modifications can be made without departing from the technical concepts of the invention set forth in the claims.

For example, in the embodiment shown in FIG. 6, an external-magnet-type magneto generator having a magnet rotor provided with a three-pole magnetic field on the external periphery of a flywheel mounted on a crankshaft of an engine is used. However, the magneto generator may have a magnet rotor rotatably driven by the engine, and a stator having an armature core into which magnetic flux is inputted from the magnet rotor and in which an ignition coil and an exciter coil are wound around said armature core. The magnet generator used in the present invention is not limited to the external magnet type magneto generator.

EXPLANATION OF NUMERALS AND CHARACTERS

1 Spark plug
2 Ignition coil
2a Primary coil of the ignition coil
2b Secondary coil of the ignition coil
2b1 First coil portion
2b2 Second coil portion
3 Ignition circuit
4 Ignition timing control unit
401 Microcomputer
402 Constant voltage power circuit
403 Rotation signal input circuit
5 Signal generator
6 Stroke determination device
6a Parameter detection means for stroke determination
6b Stroke determination means
7 Voltage detection circuit
8 Magnet rotor
9 Stator
Lex Exciter coil
Ls Signal coil
Bt Battery

The invention claimed is:

1. A stroke determination device for a four-stroke engine for establishing whether a stroke carried out in cylinders of the four-stroke engine is an exhaust stroke or a compression stroke when an ignition operation is carried out in the cylinders, the four-stroke engine comprising an engine body having at least one cylinder, and an ignition device that has an ignition coil provided for each cylinder and induces a high voltage in a secondary coil of the ignition coil by controlling a primary current of the ignition coil, and ignition being performed by applying, to a spark plug provided in each cylinder, a high voltage induced in the secondary coil of the ignition coil of the ignition device, wherein the stroke determination device is provided with
parameter detection means for stroke determination, in which a parameter that shows the characteristics of a waveform of voltage appearing at both ends of the secondary coil of the ignition coil or a waveform of current flowing through the secondary coil of the ignition coil at the time of the ignition operation, and shows a different value when the stroke carried out in the cylinders of the engine is the exhaust stroke and when the stroke is the compression stroke when the ignition operation is carried out in the cylinders, is detected as a stroke determination parameter, and
stroke determination means for establishing whether the stroke carried out when the ignition operation was carried out in each cylinder of the engine is the exhaust stroke or the compression stroke on the basis of the fact that the stroke determination parameter shows a different value between when the stroke carried out in each cylinder when the ignition operation is carried out in each cylinder is the exhaust stroke and when the stroke is the compression stroke;
the secondary coil of the ignition coil comprises a first coil portion, and a second coil portion that has fewer windings than does the first coil portion and is connected in series to the first coil portion, and a tap is drawn out from a boundary part between the first coil portion and the second coil portion, and
the parameter detection means for stroke determination is configured so as to detect the stroke determination parameter from the voltage at both ends of the second coil portion of the secondary coil of the ignition coil detected by way of the tap.

2. The stroke determination device of claim 1, wherein the second coil portion is provided so that the waveform of the voltage at both ends of the second coil portion of the secondary coil of the ignition coil is used as a waveform that approximates the waveform of voltage at both ends of the secondary coil of the ignition coil.

3. The stroke determination device of claim 2, wherein
the ignition device is a current-interrupting ignition device which performs the ignition operation by interrupting, at an ignition timing of the engine, the primary current passed through a primary coil of the ignition coil,
the parameter detection means for stroke determination is configured so as to detect, as the stroke determination parameter, a first peak value appearing in the waveform of the voltage at both ends of the second coil portion detected through the tap each time the ignition operation is carried out in the cylinders of the engine,
the stroke determination means is configured so as to perform a parameter-establishing process for establishing whether, each time the ignition operation is performed in the cylinders of the engine, the value of the stroke determination parameter detected in the present cycle by the parameter detection means for stroke determination exceeds the value of the stroke determination parameter detected in the previous cycle, and when the value of the stroke determination parameter detected in the present cycle is established by the parameter-establishing process to be in excess of the value of the stroke determination parameter detected in the previous cycle, the stroke carried out when the ignition operation is carried out in the cylinders in the present cycle is established to be the compression stroke.

4. The stroke determination device of claim 2, wherein
the ignition device is a current-interrupting ignition device which performs the ignition operation by interrupting, at an ignition timing of the engine, the primary current passed through a primary coil of the ignition coil,
the parameter detection means for stroke determination is configured so as to detect, as the stroke determination parameter, the time that starts when the voltage at both ends of the second coil portion detected through the tap each time the ignition operation is carried out in each cylinder of the engine shows a first peak value and ends when the voltage shows a second peak value,
the stroke determination means is configured so as to perform a parameter-establishing process for establishing whether, each time the ignition operation is performed in the cylinders of the engine, the value of the stroke determination parameter detected in the present cycle by the parameter detection means for stroke determination is less than the value of the stroke determination parameter detected in the previous cycle, and when the value of the stroke determination parameter detected in the present cycle is established by said parameter-establishing process to be less than the value of the stroke determination parameter detected in the previous cycle, the stroke carried out when the ignition operation is carried out in the cylinders in the present cycle is established to be the compression stroke.

5. The stroke determination device of claim 2, wherein
the ignition device is a capacitor discharge ignition device comprising an ignition capacitor provided to a primary side of the ignition coil, a capacitor charge circuit for charging the ignition capacitor to one polarity prior to an ignition timing of the engine, and a capacitor discharge circuit for discharging electric charge stored in the ignition capacitor through a primary coil of the ignition coil at the ignition timing of the engine,
the parameter detection means for stroke determination is configured so as to detect, as the stroke determination parameter, a first peak value appearing in the waveform of the voltage at both ends of the second coil portion detected through the tap each time the ignition operation is carried out in the cylinders of the engine,
the stroke determination means is configured so as to perform a parameter-establishing process for establishing whether, each time the ignition operation is performed in the cylinders of the engine, the value of the stroke determination parameter detected in the present cycle by the parameter detection means for stroke determination exceeds the value of the stroke determination parameter detected in the previous cycle, and when the value of the stroke determination parameter detected in the present cycle is established by said parameter-establishing process to be in excess of the value of the stroke determination parameter detected in the previous cycle, the stroke carried out when the ignition operation is carried out in the cylinders in the present cycle is established to be the compression stroke.

6. The stroke determination device of claim 1, wherein the second coil portion of the secondary coil of the ignition coil is provided so that the waveform of the voltage at both ends of the second coil portion of the secondary coil of the ignition coil is used as a waveform that approximates the waveform of current flowing through the secondary coil of the ignition coil.

7. The stroke determination device of claim 6, wherein a primary coil of the ignition coil and the first coil portion of the secondary coil are wound around a shared iron core for an ignition coil winding, and the second coil portion of the secondary coil is wound around a different location from the iron core for an ignition coil winding.

8. The stroke determination device of claim 6, wherein the second coil portion of the secondary coil of the ignition coil comprises a pair of coils that have an equal number of windings, are wound in opposite directions, and are connected to each other in parallel.

9. The stroke determination device of claim 6, wherein
the ignition device is a current-interrupting ignition device which performs the ignition operation by interrupting, at an ignition timing of the engine, the primary current passed through a primary coil of the ignition coil,
the parameter detection means for stroke determination is configured so as to detect, as the stroke determination parameter, a peak value of the voltage at both ends of the second coil portion detected through the tap each time the ignition operation is carried out in the cylinders of the engine,
the stroke determination means is configured so as to perform a parameter-establishing process for establishing whether, each time the ignition operation is performed in the cylinders of the engine, the value of the stroke determination parameter detected in the present cycle by the parameter detection means for stroke determination is less than the value of the stroke determination parameter detected in the previous cycle, and when the value of the stroke determination parameter detected in the present cycle is established by said parameter-establishing process to be less than the value of the stroke determination parameter detected in the previous cycle, the stroke carried out when the ignition operation is carried out in the cylinders in the present cycle is established to be the compression stroke.

10. The stroke determination device of claim 6, wherein
the ignition device is a capacitor discharge ignition device comprising an ignition capacitor provided to a primary side of the ignition coil, a capacitor charge circuit for charging the ignition capacitor to one polarity prior to an ignition timing of the engine, and a capacitor discharge circuit for discharging electric charge stored in the ignition capacitor through a primary coil of the ignition coil at the ignition timing of the engine,
the parameter detection means for stroke determination is configured so as to detect, as the stroke determination parameter, a first peak value appearing in the waveform of the voltage at both ends of the second coil portion detected through the tap each time the ignition operation is carried out in the cylinders of the engine,
the stroke determination means is configured so as to perform a parameter-establishing process for establishing whether, each time the ignition operation is performed in the cylinders of the engine, the value of the stroke determination parameter detected in the present cycle by the parameter detection means for stroke determination is less than the value of the stroke determination parameter detected in the previous cycle, and when the value of the stroke determination parameter detected in the present cycle is established by said parameter-establishing process to be less than the value of the stroke determination parameter detected in the previous cycle, the stroke carried out when the ignition operation is carried out in the cylinders in the present cycle is established to be the compression stroke.

11. The stroke determination device of claim 1, wherein the stroke determination means is configured so as to finalize the result of stroke determination when establishment that the stroke performed at the time the ignition operation was performed in the cylinders is the compression stroke has been made a fixed number of times.

* * * * *

UNITED STATES PATENT AND TRADEMARK OFFICE
CERTIFICATE OF CORRECTION

PATENT NO. : 11,149,678 B2
APPLICATION NO. : 16/493839
DATED : October 19, 2021
INVENTOR(S) : Takuma Ayuzawa et al.

It is certified that error appears in the above-identified patent and that said Letters Patent is hereby corrected as shown below:

In the Specification

Column 27, Line 47, "spark plug 2, and" should be --spark plug 1, and--.

Column 27, Line 48, "spark plug 2 to spark," should be --spark plug 1 to spark,--.

Signed and Sealed this
Thirty-first Day of May, 2022

Katherine Kelly Vidal
*Director of the United States Patent and Trademark Office*